United States Patent
Wall et al.

(10) Patent No.: US 11,539,512 B2
(45) Date of Patent: *Dec. 27, 2022

(54) SYSTEMS AND METHODS FOR MULTI-REGION ENCRYPTION/DECRYPTION REDUNDANCY

(71) Applicant: Stripe, Inc., San Francisco, CA (US)

(72) Inventors: Jonathan Wall, San Francisco, CA (US); Gautam S. Raj, Sunnyvale, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,930

(22) Filed: Oct. 9, 2020

(65) Prior Publication Data

US 2021/0083859 A1 Mar. 18, 2021

Related U.S. Application Data

(63) Continuation of application No. 15/788,729, filed on Oct. 19, 2017, now Pat. No. 10,805,070.

(Continued)

(51) Int. Cl.
*H04L 9/08* (2006.01)
*H04L 9/40* (2022.01)
(Continued)

(52) U.S. Cl.
CPC ............ *H04L 9/0822* (2013.01); *G06F 16/23* (2019.01); *G06F 21/00* (2013.01); *G06F 21/602* (2013.01);

(Continued)

(58) Field of Classification Search
CPC ... H04L 9/0822; H04L 9/0631; H04L 9/0643; H04L 9/0877; H04L 9/0894;
(Continued)

(56) References Cited

U.S. PATENT DOCUMENTS 6,993,503 B1 1/2006 Heissenbuttel et al.
8,762,268 B2 6/2014 Wall et al.
(Continued)

OTHER PUBLICATIONS

Search Report and Written opinion dated Nov. 29, 2017 which issued in the International Patent Application No. PCT/US17/50633.

*Primary Examiner* — Ayoub Alata
(74) *Attorney, Agent, or Firm* — Womble Bond Dickinson (US) LLP

(57) ABSTRACT

Methods and systems for encrypting and decrypting data comprising sending sensitive information to a first cryptographic processing system in a first cloud region for encryption with a first key encryption key generated by and stored by the first cryptographic processing system. The first encrypted sensitive information received from the first cryptographic processing system is stored in a first database. The sensitive information is also sent to a second cryptographic processing system in a second cloud region different from the first cloud region for encryption with a second key encryption key generated by and stored by the second cryptographic processing system. The second encrypted sensitive information received from the second cryptographic processing system is stored in a second database. If the first encrypted sensitive information cannot be decrypted by the first cryptographic processing system, the second encrypted sensitive information is sent to the second cryptographic processing system.

20 Claims, 19 Drawing Sheets

Related U.S. Application Data

(60) Provisional application No. 62/410,148, filed on Oct. 19, 2016.

(51) Int. Cl.
| | |
|---|---|
| *H04L 9/06* | (2006.01) |
| *G06F 16/23* | (2019.01) |
| *G06F 21/60* | (2013.01) |
| *H04L 9/32* | (2006.01) |
| *G06F 21/62* | (2013.01) |
| *G06F 21/00* | (2013.01) |
| *G06F 40/205* | (2020.01) |
| *G06Q 20/38* | (2012.01) |
| *G06F 16/22* | (2019.01) |

(52) U.S. Cl.
CPC ........ *G06F 21/6209* (2013.01); *G06F 40/205* (2020.01); *G06Q 20/3829* (2013.01); *H04L 9/0631* (2013.01); *H04L 9/0643* (2013.01); *H04L 9/0877* (2013.01); *H04L 9/0894* (2013.01); *H04L 9/3239* (2013.01); *H04L 63/06* (2013.01); *H04L 63/08* (2013.01); *G06F 16/2219* (2019.01); *H04L 63/0428* (2013.01); *H04L 63/126* (2013.01); *H04L 2209/72* (2013.01)

(58) Field of Classification Search
CPC ....... H04L 9/3239; H04L 63/06; H04L 63/08; H04L 63/048; H04L 63/126; H04L 2209/72; G06F 16/23; G06F 40/205; G06F 21/00; G06F 21/602; G06F 21/6209; G06F 16/2219; G06Q 20/3829
See application file for complete search history.

(56) References Cited

U.S. PATENT DOCUMENTS

| | | | |
|---|---|---|---|
| 9,020,151 B1* | 4/2015 | Chen | H04L 9/08 |
| | | | 380/277 |
| 10,013,431 B2* | 7/2018 | Luthra | G06F 16/23 |
| 2002/0111919 A1 | 8/2002 | Weller et al. | |
| 2005/0159974 A1 | 7/2005 | Moss et al. | |
| 2008/0165006 A1 | 7/2008 | Phillips | |
| 2010/0011221 A1* | 1/2010 | Lin | H04L 9/3226 |
| | | | 713/189 |
| 2011/0264499 A1 | 10/2011 | Abendroth et al. | |
| 2012/0084135 A1* | 4/2012 | Nissan | G06Q 30/0238 |
| | | | 705/14.38 |
| 2013/0304642 A1 | 11/2013 | Campos | |
| 2014/0012701 A1 | 1/2014 | Wall et al. | |
| 2014/0075464 A1 | 3/2014 | McCrea | |
| 2014/0156535 A1 | 6/2014 | Jabbour et al. | |
| 2014/0207575 A1 | 7/2014 | Freed-Finnegan et al. | |
| 2014/0222668 A1 | 8/2014 | Wall et al. | |
| 2014/0281545 A1 | 9/2014 | Erofeev et al. | |
| 2015/0154634 A1 | 6/2015 | Chiu et al. | |
| 2015/0207880 A1 | 7/2015 | Jin et al. | |
| 2016/0191236 A1 | 6/2016 | Smirnoff et al. | |
| 2016/0267023 A1 | 9/2016 | Perumpuli Arachchi et al. | |
| 2017/0244693 A1* | 8/2017 | Papadopoulos | H04L 9/0861 |
| 2018/0034787 A1 | 2/2018 | Kamaraju et al. | |
| 2018/0068303 A1 | 3/2018 | Wall et al. | |
| 2018/0167204 A1 | 6/2018 | Wall et al. | |
| 2018/0307704 A1 | 10/2018 | Luthra et al. | |
| 2018/0331824 A1* | 11/2018 | Racz | G08B 13/196 |

* cited by examiner

SYSTEMS AND METHODS FOR MULTI-REGION ENCRYPTION/DECRYPTION REDUNDANCY

RELATED APPLICATION

The present application claims the benefit of U.S. Pat. No. 10,805,070, which was issued on Oct. 13, 2020, which claims the benefit of U.S. Provisional Patent Application No. 62/410,148, which was filed on Oct. 19, 2016, both of which are assigned to the Assignee of the present invention, and are incorporated by reference herein.

FIELD OF THE INVENTION

Multi-region encryption/decryption redundancy and, more particularly, multi-region encryption/decryption through the use of cryptographic processing systems, such as key management services and/or hardware security modules in each region.

BACKGROUND OF THE INVENTION

Cloud-Based Applications

Cloud-based hosting providers, such as Amazon Web Services, Inc., Seattle, Wash. ("AWS"), provide servers, networking, firewalls, security appliances, and other infrastructure through a scalable cloud model by installing physical versions of those infrastructure elements in datacenters located around the world, and providing access to the infrastructure over the public internet by creating "virtual" versions of the elements. For example, an AWS server is a virtual interface, written in software, which has the characteristics of a physical server. Similarly, an AWS router and an AWS firewall are virtual versions of a physical router and physical firewall, respectively, with the same level of configuration and customization associated with an on-site, hardware system.

An important benefit of using a cloud-based solution is scalability, as it is easier to add server capacity than to install new physical hardware at an on-site datacenter. Other benefits include decreased maintenance costs, and redundancy. Most cloud providers host identical datacenters in different "regions," where regions may be defined differently by different cloud providers, and allow customers to set-up their infrastructure in one or more regions. Data center regions may be geographic based or not.

Most of AWS's infrastructure provides additional redundancy within each region in case of failure within a region by creating multiple Availability Zones ("AZs"). Each region may be comprised of many AZs, each representing additional co-located datacenters in the same metropolitan area to minimize latency. AZs may use different power supply companies, and/or different network providers, etc., to prevent shared failure.

While AZs provide a good degree of redundancy, a common best practice is to also employ region redundancy when hosting business-critical information and/or applications in the cloud. Region redundancy in case of failure is the virtual equivalent of a disaster recovery process. If a physical datacenter were to flood, suffer a power failure or fire, or another such failure or breakdown, for example, data may be backed up and stored in backup storage devices.

Security

Computational security relies heavily on the concept of keys, which are used to encrypt and decrypt data and to ensure that data received over the internet has not been interfered with or intercepted in transport. A common method to ensure secure communication between two parties or servers, for example, is the use of RSA public-private key encryption. In RSA public-private key encryption, each party generates a private key, which is kept secret, and a public key, which may be shared. The public and private keys generated by each party (referred to as a "key pair") have a computational relationship such that data encrypted with the public key can only be decrypted by the corresponding private key. The public and private keys may be both generated based on the same prime number, for example.

Using this model, if Bob wants to send a secure message to Alice, who has a public key and a computationally related private key, he does the following:

Bob asks Alice for her public key, or looks it up if already known;

Bob encrypts the message with Alice's public key, creating a secure message;

Bob sends the secure message to Alice; and

Alice decrypts the secure message using her private key, which only she should know.

Only Alice's private key can be used to decrypt Bob's message since it was encrypted using the corresponding, computationally-related public key.

A common approach to ensure secure storage of private keys and other sensitive data is to employ a cryptographic hardware device, such as a hardware security module ("HSM"). The HSM generates and stores keys, such as symmetric encryption keys that may be used to encrypt and decrypt data for clients. HSMs are inherently secure devices that use extensive hardening techniques to securely generate and store keys. The hardening techniques include never storing plaintext master keys on disk, not persisting them in memory, destroying a key if a tamper event is detected, and/or limiting the systems that can connect to the device, for example. As with other cloud infrastructure elements, AWS provides a "virtual" HSM or a key management service ("KMS") that is backed by a hardware HSM in a given Amazon region datacenter to create and control key generation and data encryption/decryption based on the generated keys. Generated keys never leave their respective HSM or KMS, and can only be accessed by specific servers and authenticated users. A highly secure algorithm, such as an RSA key generation algorithm, may be used to generate the client keys by the KMS or the HSM, for example. As used herein, HSMs, KMSs, and other such devices and services are referred to as "cryptographic processing systems."

Respective clients may send data to the KMS or HSM for encryption by one of the client encryption keys. The encrypted data is returned to the client. When the client desires that encrypted data be decrypted, the client sends the encrypted data to the KMS or HSM, which decrypts the data with the same client key used to encrypt the data, and sends the decrypted data to the client.

SUMMARY OF THE INVENTION

In embodiments of the invention, sensitive information, such as the sensitive information discussed above, is encrypted based on respective key encryption keys generated by KMSs or HSMs in different regions, to increase fault tolerance and add redundancy in case of a failure of a KMS/HSM in one region. The data encrypted by each KMS/HSM may be stored in the secure database and data decrypted by each KMS/HSM is stored in volatile memory. If first encrypted data encrypted by a first KMS/HSM in a first region cannot be decrypted by the first KMS/HSM, corresponding second encrypted data that was encrypted by a second KMS/HSM in a second region may be decrypted by the second KMS/HSM. One or more additional KMS/HSM in one or more additional regions may be provided.

In accordance with a first embodiment of the invention, a method of encrypting and decrypting data is disclosed comprising sending sensitive information to a first cryptographic processing system in a first cloud region for encryption with a first key encryption key generated by and stored by the first cryptographic processing system. The first encrypted sensitive information received from the first cryptographic processing system is stored in a first database. The sensitive information is also sent to a second cryptographic processing system in a second cloud region different from the first cloud region for encryption with a second key encryption key generated by and stored by the second cryptographic processing system. The second encrypted sensitive information received from the second cryptographic processing system is stored in a second database. The first database and the second database are the same database, and the first and second database may be secure databases, or a secure database. The first cryptographic processing system may comprise a key management service and/or a hardware security module, and the second cryptographic processing system comprises a key management service and/or a hardware security module.

The first encrypted sensitive information and the second encrypted sensitive information may be formed into an object that is stored in the database or databases. The sensitive information may comprise a plurality of types of sensitive information and the method further comprise forming the first encrypted sensitive information and the second encrypted sensitive information of each type of sensitive information into respective objects that are stored in the one or more databases. A respective object of encrypted sensitive information of a first type may be retrieved from the database and parsed to identify the first encrypted sensitive information of the first type encrypted by the first cryptographic processing system, and to identify the second encrypted sensitive information of the first type encrypted by the second cryptographic processing system. The first and second encrypted sensitive information of the first type are sent to the first cryptographic processing system for decryption.

In one example, the first encrypted sensitive information retrieved from the first database is retrieved and sent the first cryptographic processing system for decryption. If the first decrypted sensitive information is received from the cryptographic processing system within a period of time, then the decrypted sensitive information is stored in memory. If the first decrypted sensitive information is not received from the cryptographic processing system within a period of time, then the second encrypted sensitive information is retrieved from the second database and sent to the second cryptographic processing system for decryption. If the second decrypted sensitive information is received from the cryptographic processing system within a period of time, then the second decrypted sensitive information in memory. The memory may be volatile memory, for example.

The first sensitive information may also be sent to a third cryptographic processing system in a third cloud region for encryption with a third encryption key. The third encrypted sensitive information is stored in a third database, which may be the same as the second and first databases. If the second encrypted information is not received from the second cryptographic processing system within a second period of time, then the third encrypted sensitive information is retrieved from the third database and sent to third cryptographic processing system for decryption. If the third decrypted sensitive information is received from the third cryptographic processing system, then it is stored in memory, which can be volatile memory, for example. The first encrypted private key is retrieved from the database and sent to the first cryptographic processing system for decryption with the first key encryption key. The received decrypted private key is stored in volatile memory. If the first decrypted private key is not received from the cryptographic processing system within a period of time, then the second encrypted private key is retrieved from the database and sent to the second encrypted private key to the second cryptographic processing system for decryption. If the first decrypted sensitive information is received from the cryptographic processing system within a period of time, then the first encrypted sensitive information is stored in volatile memory. The sensitive information may also comprise salts and/or encryption keys. The sensitive information may comprise a binary large object comprising a plurality of concatenated salts.

In accordance with a second embodiment the invention, a system for encrypting and decrypting data is also disclosed comprising at least one database and a processing device configured to operate as described above with respect to the first embodiment.

In accordance with another embodiment of the invention, card information on cards, including the card number and other card information, such as the cardholder name, card expiration date, card verification value ("CVV"), and other information that may be provided on magnetic tracks of the card, as described in ISO/IEC 7813, or on an EMV card, for example, is also encrypted. EMV is a technical standard for smart payment cards, which include an integrated circuit or chip embedded into the card. EMV stands for Europay, MasterCard, and Visa, who created the standard. Smart payment cards are referred to as "EMV cards," "chip cards," or integrated circuit ("IC") cards or ICCs, for example. The card information from the magnetic tracks or EMV cards may be encrypted by a selected one of a plurality of a secure keys, such as an AES key, for example.

Embodiments of the invention may be used in cloud-based systems or non-cloud based systems. As discussed above, hardware security modules ("HSMs"), and key management services ("KMSs"), and other such devices and services, are referred to herein as "cryptographic processing systems."

DETAILED DESCRIPTION

Figure 1:
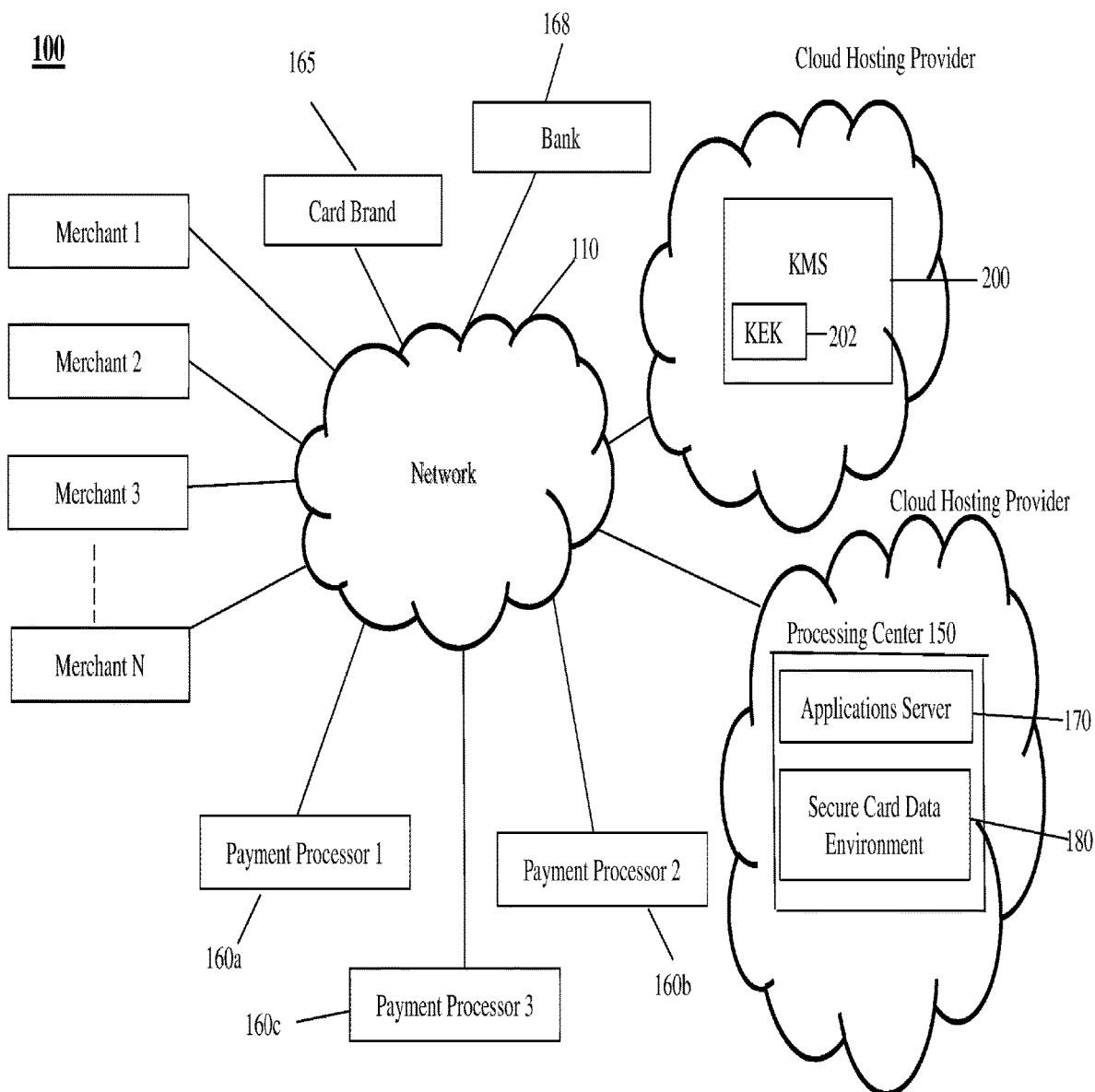
FIG. 1 is block diagram of an example of a card payment processing environment 100 in which embodiments of the invention may be implemented.

FIG. 1 is block diagram of an example of a card payment processing environment 100 in which embodiments of the invention may be implemented. The card may be a credit card, debit card, or gift card, for example. The environment 100 includes Merchants 1, 2, 3 . . . N are coupled to a network 110, such as the internet, for example. A processing center 150 is also coupled to the network 110. Transaction data is sent from the Merchants 1, 2, 3 . . . N to the processing center 150 via the network 110 for processing. The processing center 150 may be in a cloud-based environment provided by a cloud hosting provider such as the Amazon Web Services provided by Amazon, Inc., Seattle, Wash., for example. Amazon Web Services is compliant with payment credit industry data security standard ("PCI DSS"), for example. Other PCI DSS compliant cloud-based environments may also be used. Alternatively, the processing center 150 may comprise physical hardware, such as computers and servers, coupled to the network 110. In this example, the Merchants 1, 2, 3 . . . N are separate entities from the processing center 150. A local data center may also use embodiments of the invention to provide internal security, whose components are coupled via a local area network, for example. The processing center 150 may be a payment gateway, such as Index Systems, Inc. San Francisco, Calif., for example, which provides customer analytics and payment gateway services to the Merchants 1, 2, 3 . . . N and other parties in FIG. 1.

Figure 2:
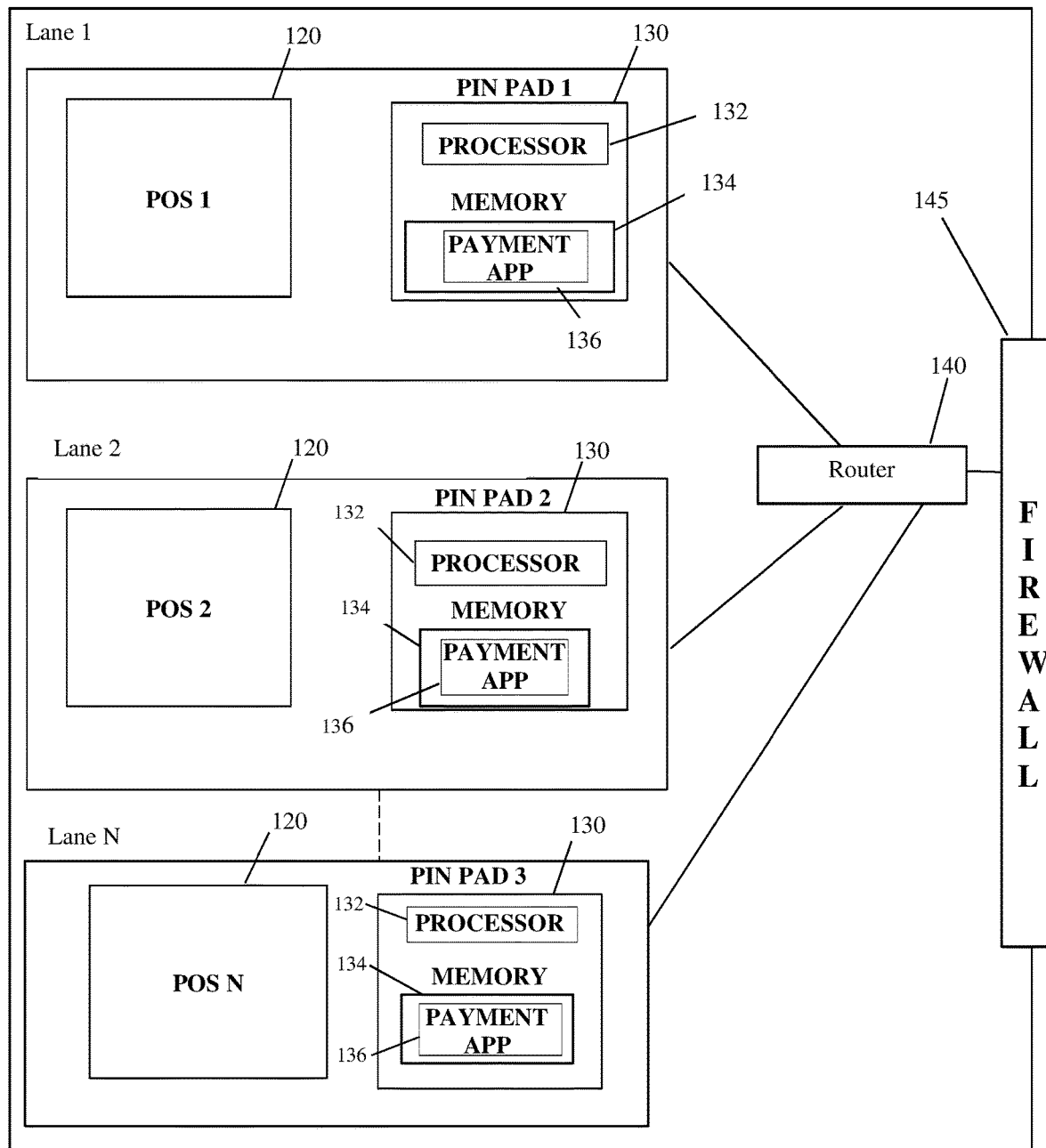
FIG. 2 is a block diagram of an example of a Merchant, which is representative of the Merchants in FIG. 1.

FIG. 2 is a block diagram of an example of a Merchant 1, which is representative of the Merchants 2, 3 . . . N. The Merchant 1 includes one or more points of sale ("POS") terminals 120 and respective PIN pad terminals 130. Pairs of POSs 120 and PIN pads terminals 130 may be provided in respective checkout lanes 1, 2 . . . N for example, at the location of the Merchant 1. The PIN pad terminal 130 provides transaction data to a router 140 wirelessly or via a cable, for example. The router 140 forwards the transaction data to the network 110 through a firewall 145. The PIN pads 130 include a processor 132 and memory 134. The processor may be a microprocessor, for example. The PIN pad 130 typically also includes a magnetic stripe reader (not shown) to read data on the tracks of a magnetic stripe on a card. The PIN pad terminals 130 may also include a reader (not shown) to receive and interact with an EMV card. The PIN pad terminal 130 receives purchase data from the POS terminal 120 and card information from the purchaser's card, which may be swiped or inserted into the PIN pad terminal 130, depending on whether the card is an EMV card or not, for example.

A payment application ("Payment App") 136 is stored in the memory 134 of the PIN pad 130. The payment App 136 controls operation of the processor 132 of the PIN pad terminal 130 including encrypting purchase data and payment information, transmitting the encrypted data and information to the processing center 150, and providing a personalized checkout experience including the identification of relevant loyalty offers/discounts that could be calculated prior to payment authorization, for example. The Payment App 136 may be downloaded to the PIN pad terminals 130 of the Merchant 1 after the Merchant 1 registers with the processing center 150, as discussed further below. The PIN pad terminals 130 may be a Verifone MX915 or Verifone MX925, available from Verifone Holdings, Inc., San Jose Calif., or an Ingenico iSC250 or Ingenico iSC480, available from Ingenico Solutions, Rowlands Castle, England, for example.

Returning to FIG. 1, a plurality of payment processors 160a, 160b, 160c are also coupled to the network 110. More or fewer payment processors 160a-160c may be provided. After processing the transaction data in accordance with embodiments of the invention, as discussed in more detail below, authorization to accept payment via the proffered card is requested by the processing center 150 from the appropriate payment processor 160a-160c. Authorization is requested in an encrypted, HTTPS envelope that is sent to the respective payment processor 160a-160c via the network 110, for example. The respective payment processor 160a-160c stores transaction data to provide daily, weekly, and/or monthly summary reports to Merchants 1, 2, 3 . . . N. The respective payment processor 160a-160c also validates aspects of the data received from the PIN pad terminal 130 and passed on by the processing center 150, as is known in the art.

After validation, the payment processor 50 routes the data to the card brand 165 of the card, such as Visa or Master-Card, for example, also in an encrypted HTTPS envelope, for verification of the card number and expiration date, transaction approval/denial, and other operations known in the art. Only one block 165 is shown to represent the multiple card brands, for ease of illustration. If the card data is verified by the card brand 165, the card and transaction data are routed by the card brand to the bank 168 that issued the credit card to check credit limits and perform other operations known in the art, also in an encrypted HTTPS envelope. Only one block 168 is shown to represent multiple possible issuing banks, for ease of illustration.

If the issuing bank 165 approves the transaction, it sends an authorization or approval message back along the chain, to the card brand 165, payment processor 160a, processing center 150, to the respective PIN pad 130 of the Merchant 1, via the network 110 in each step, in respective encrypted HTTPS envelopes. The PIN pad 130 receiving the authorization then accepts the payment via the card and completes the transaction. If the card brand 165 or the issuing bank 168 docs not verify the card data or authorize the transaction, respectively, a denial message is returned along the same chain to the payment processor 160a and processing center 150, via the network 110, to the respective PIN pad 130. The PIN pad 130 will not then accept the card payment. An alternative form of payment, such as another card, may then be requested.

As shown in FIG. 1, the processing center 150 includes an applications server 170 and a secure card data environment ("SCDE") server 180. The application server 170 provides customer and merchant analytics and performs gateway functions. The SCDE server 180 processes sensitive information, such as card and transaction data. In accordance with an embodiment of the invention, the SCDE server 180 only communicates with the network 110 through the applications server 170. This protects against accidental data leakage. Multiple applications servers 170 and/or multiple SCDE servers 180 may be provided. In this example, the application server 170 and the SCDE server 180 are virtual servers forming a virtual private cloud ("VPC"). The servers 170, 180 may also be physical servers or computers in a non-cloud based environment. Operation of the processing center 150 is described in more detail below.

In accordance with an embodiment of the invention, a key management service ("KMS") 200 provided by the cloud hosting provider is used to generate one or more keys to encrypt sensitive information provided by the SCDE server 180 of the processing system 150. The KMS 200 may be provided part of a service 200, such as the KMS provided by Amazon Web Services ("AWS"), for example. Other cloud hosting providers include Microsoft, Inc., Redmond, Wash., and Google, Inc., Mountain View, Calif., for example.

The KMS 200 from AWS is a virtualized version of a cryptographic hardware device, such as hardware security module ("HSM"), where the processing device and secure storage are located. The KMS 200 uses at least one processing device and a secure database (not shown), such as a processing device and secure database of an HSM, to generate and secure, store one or more encryption keys for clients. The KMS 200 uses at least one processing device and a secure database (not shown) to generate and secure, store one or more encryption keys for clients. The KMS 200 may communicate with the network 110 via an application interface (not shown), for example, as is also known in the art. While the KMS 200 is referred to throughout this description, embodiments of the invention may also be implemented with any virtual or non-virtual cryptographic processing system that generates and securely stores encryption keys, such as an HSM, for example.

Figure 3:
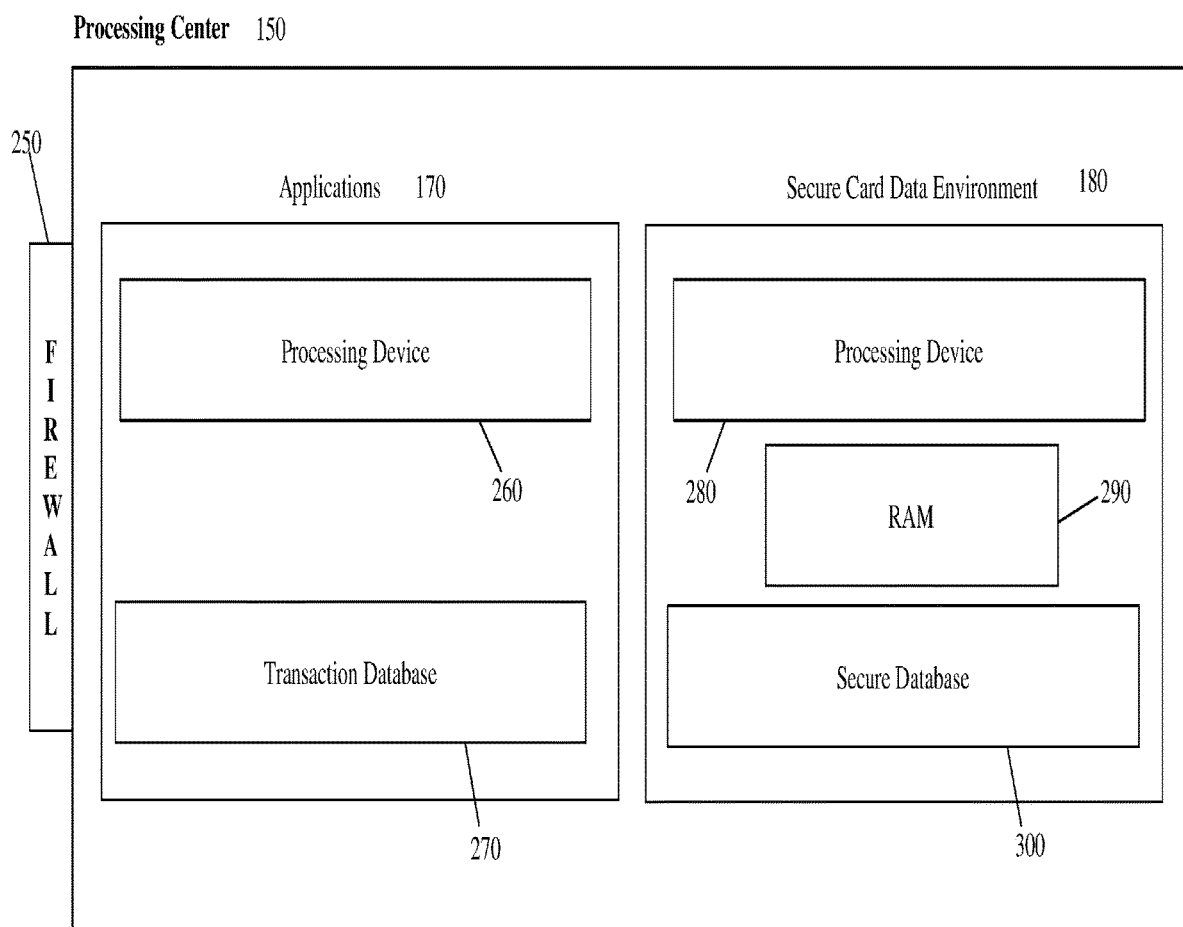
FIG. 3 is a more detailed block diagram of the processing center of FIG. 1.

FIG. 3 is a more detailed block diagram of the processing center 150. The processing center 150 includes a firewall 250 that monitors data packets received from and sent to the network 110 in accordance with rules defined by the processing center 150 as is known in the art. The applications server 170 comprises at least one processing device 260 and at least one database, including a transactions database 270. The processing device 260 may be a computer or microprocessor, for example. The secure card data environment ("SCDE") comprises at least one processing device 280, volatile memory 290, such as random access memory ("RAM"), and a secure database 300. As above, the processing device 280 may be a computer or microprocessor, for example. The secure database 300 stores sensitive card holder data, including the credit card numbers and merchant private keys, for example, as discussed further below.

In one example, to provide extra security for the encrypted data stored in the secure database 300, only the processing device 280 can access the secure database 300, and only the applications server 170 can access the processing device 280. To further protect decrypted sensitive information, such information may only be stored in RAM 290 or other volatile memory and may be deleted after use. The processing device 280 may use the RAM 290 or other such memory (not shown) while performing calculations and other functions, as described below. The secure database 300 may be a MongoDB available from MongoDB, Inc., New York, N.Y., for example. The MongoDB database is a document-oriented, non-relational non-structured query language (non-SQL or NoSQL) database. Other types of databases, such as an SQL database or a relational management database, may also be used. Examples of SQL relational databases include MySQL, an open source relational database system available from MySQL AB, Sweden, for example, and PostgreSQL, an object relational database management system available from the PostgreSQL Global Development Group, for example. Any of these databases may be made secure by limiting access to the database, for example, as described above.

In accordance with an embodiment of the invention, sensitive information is encrypted by the KMS 200 with a key, referred to a key encrypting key ("KEK") that is generated by the KMS. The KEK is shown schematically within the KMS 200 in FIG. 1. The KEK in this example is a symmetric key, such as 256-bit advanced encryption standard ("AES") key. Other highly secure encryption techniques for creating reversible keys may also be used to create the KEK. The KEK is only used and stored by the KMS 200. The KEK never leaves the KMS 200—data must be sent to it for encryption and decryption. The KEK is therefore protected, helping to maintain security by making attacks, hacks, data theft, etc. of the encrypted data more difficult or infeasible.

Figure 4:
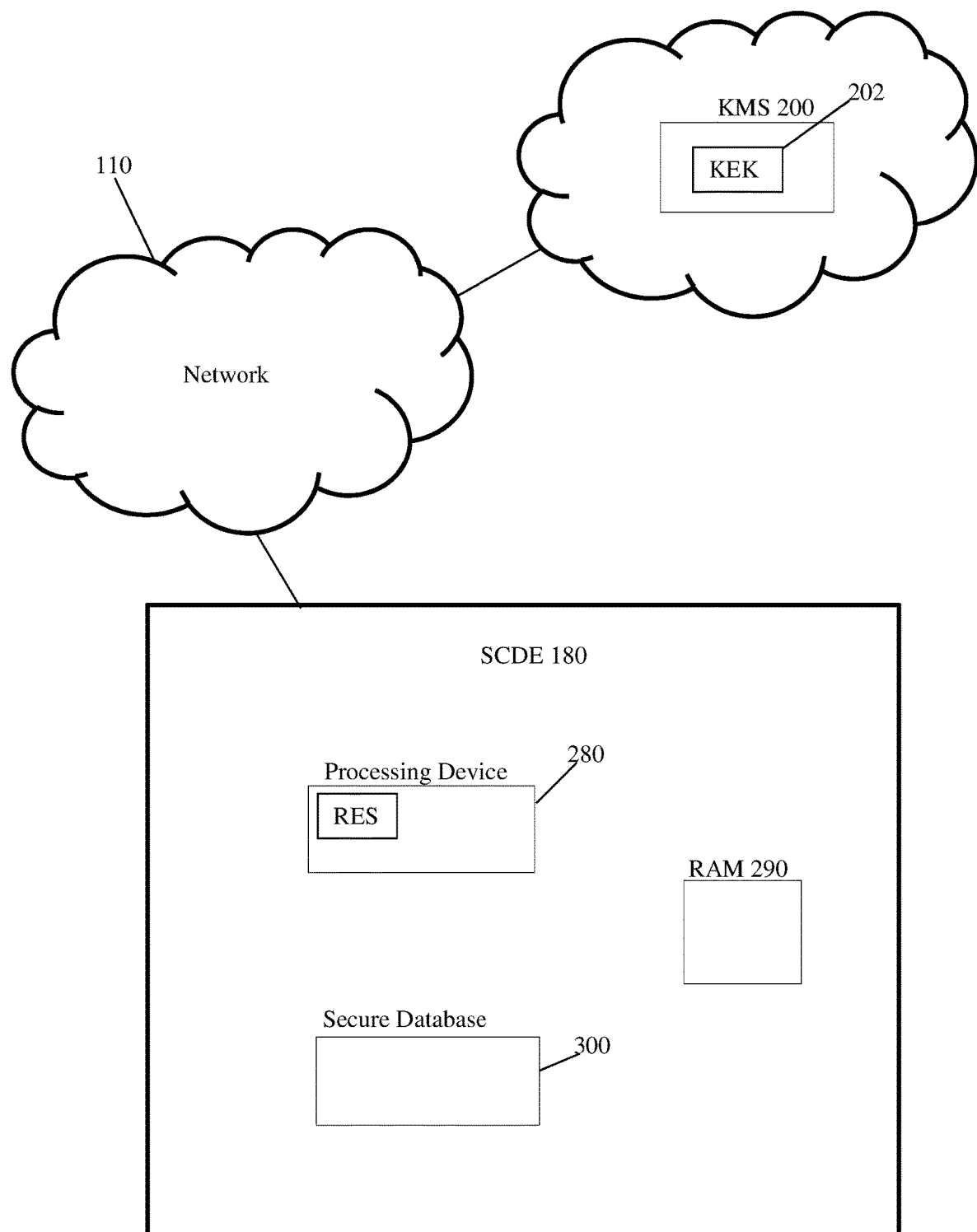
FIG. 4 is a simplified, schematic representation of a portion of the system of FIG. 1, showing the KMS, the SCDE, and the network.

FIG. 4 is a simplified, schematic representation of a portion of the system 100 of FIG. 1, showing the KMS 200, the SCDE 180, and the network 110. The KEK 202 generated by the KMS 200 is also shown schematically within the KMS in FIG. 4. The KEK 202 may be generated in response to a request for a key by the processing center 150, for example. Amazon Web Services, for example, provides an on-line console via a web interface for requesting KEKs. Sensitive information, referred to herein as a region encrypted secret ("RES"), is shown schematically in the processing device 280 of the SCDE 300. One or more KEKs 200 may be generated and stored by the KMS 200 for the processing center 150, as requested by the processing center. For example, the processing center 150 may request different KEKs to encrypt different types of sensitive data. The KMS 200 also generates a KEK reference ("$KEK^R$") for each KEK and sends it to the processing device 280 of the processing center 150 for storage in the secure database 300. The $KEK^R$ identifies the respective KEK used to encrypt the respective RES so that when the processing center 150 sends the encrypted RES to the KMS 200 to be decrypted, the KMS can identify the KEK used to encrypt the respective data. The $KEK^R$ may identify the location of the respective KEK in the KMS 200, for example.

Figure 5:
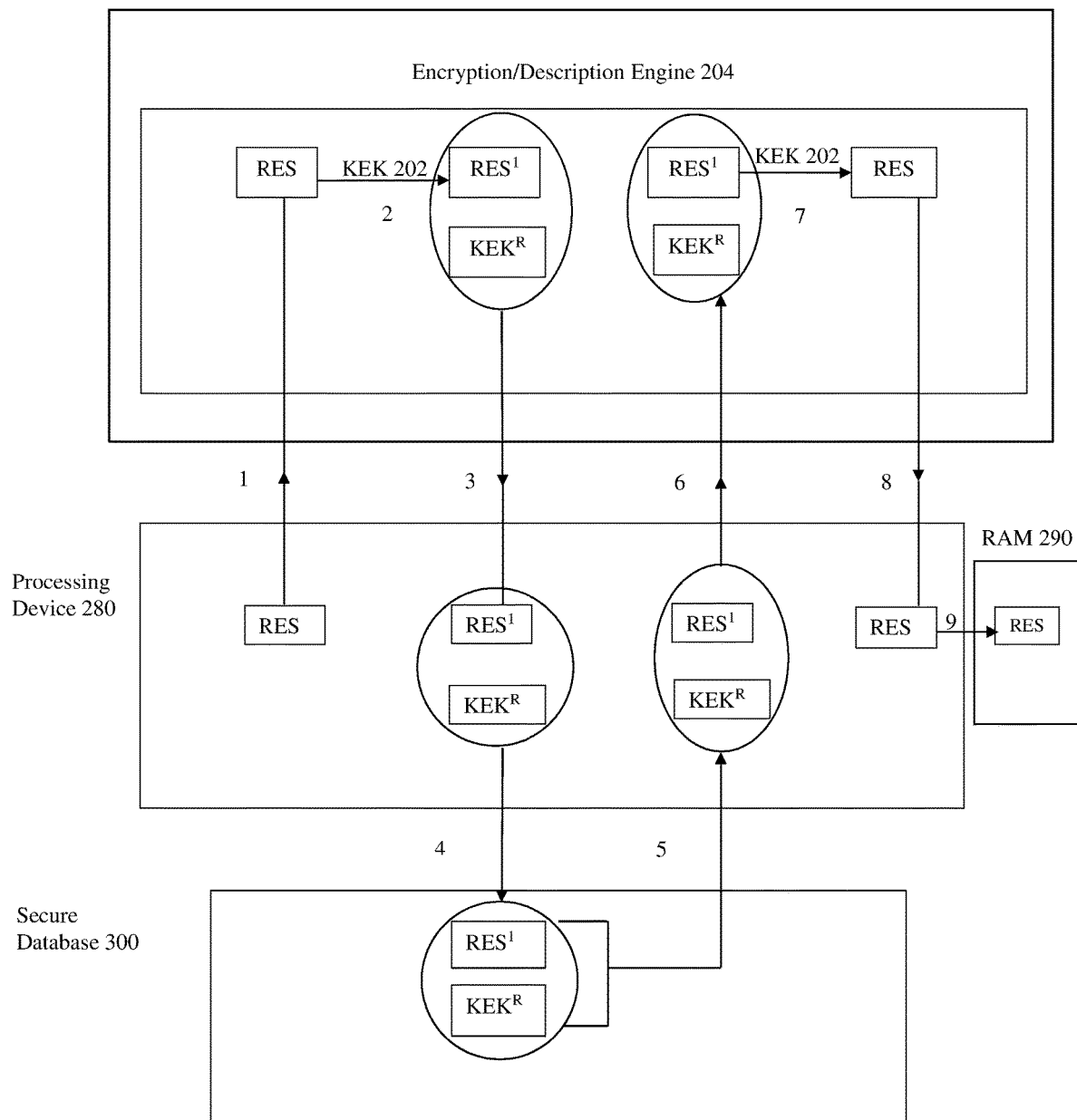
FIG. 5 is a flow diagram of a method of encrypting and decrypting sensitive information (also referred to herein as an RES), in accordance with an embodiment of the invention.

FIG. 5 is a flow diagram of a method of encrypting and decrypting sensitive information (also referred to herein as an RES, as discussed above) in accordance with an embodiment of the invention. In FIG. 5, the network 110 and the application server 170 are not shown for ease of illustration, but it is understood that communication between the KMS 200 and the SCDE 280 is through the KMS interface, the network 110, and the applications server 170.

To encrypt the sensitive information (RES), the RES is sent by the processing device 280 of the SCDE 180 to the KMS across the network 110, as indicated by line 1. The RES may be sent in a secure envelope or package, such as via a secure HTTP ("HTTPS") connection along a transport layer security version 1.2 ("TLS 1.2"), for example. The RES is encrypted by what is referred to as an encryption/decryption engine 204 of the KMS 200 with the KEK, as indicated by line 2. It is noted that the encryption/decryption engine is a functional representation of the operation of the KMS 200 and is not meant to show the exact operation of the KMS 200. How the KMS 200 encrypts and decrypts data based on the KEK and $KEK^R$ are not aspects of the present invention and are known in the art.

The encrypted RES is now referred to as RES' where (') indicates that the RES is encrypted. The RES' is associated with a reference KEK ("$KEK^R$") that identifies the KEK 202 used to encrypt the respective RES, as discussed above. The RES' and the $KEK^R$ are returned to the processing device 280 of the SCDE 180 (via the network 110 and applications server 170, which are not shown in this view), along line 3.

The received RES' and the associated $KEK^R$ are sent by the processing device 280 of the SCDE 180 to the secure database 300, for storage, as indicated by line 4. When the RES (non-encrypted data) is needed, as discussed below, the RES' (encrypted RES) and associated $KEK^R$ are retrieved from the secure database 300 by the processing device 280, as indicated by line 5, and sent to the KMS 200, as indicated by line 6. It is noted that when the processing center 150 has only requested one (1) KEK, it may not be necessary to return the $KEK^R$ to the KMS 200 since the KMS can identify the one KEK based on the processing center that provided the provided the data to be decrypted. Returning the $KEK^R$ with the RES' in such circumstances is, therefore, optional. If the processing center 150 has requested multiple KEKs, to encrypt different types of RESs, for example, it would be necessary to send the respective $KEK^R$ with the RES' to be decrypted.

In this example, the KEK 202 used to initially encrypt the RES is identified by the KMS 200 based on the $KEK^R$, and the RES' is decrypted by the encryption/description engine 204 based on the KEK 202 to generate the RES, as indicated by line 7. The decrypted RES' is returned to the processing device 280 of the SCDE 180, as indicated by line 8, and stored in the RAM 290, as indicated by line 9, via the network 110 and the applications server 170.

The RES is retrieved from the RAM 290 when needed by the SCDE 180. If the processing center 150 suffers a power failure or other catastrophic failure, for example, the RES is lost, protecting the unencrypted sensitive data. As noted above, the corresponding encrypted RES (RES') is maintained in the secure database 300, in an encrypted, secure form.

In one example of the card payment processing environment of FIG. 1, the types of RES's that may be encrypted and decrypted by the KMS 200, include a merchant private key assigned to respective merchants, a "blob" of salts used in card encryption, and AES keys used in card encryption. The merchant private key is used to decrypt data encrypted by the PIN pad terminal 130 based on the associated merchant public key. The salts and AES keys are used in the encryption of the card number (or personal account number) and the card data, respectively, as discussed further below. In this embodiment, the card number and card data themselves are not encrypted by the KMS 200.

Merchant Registration

Figure 6:
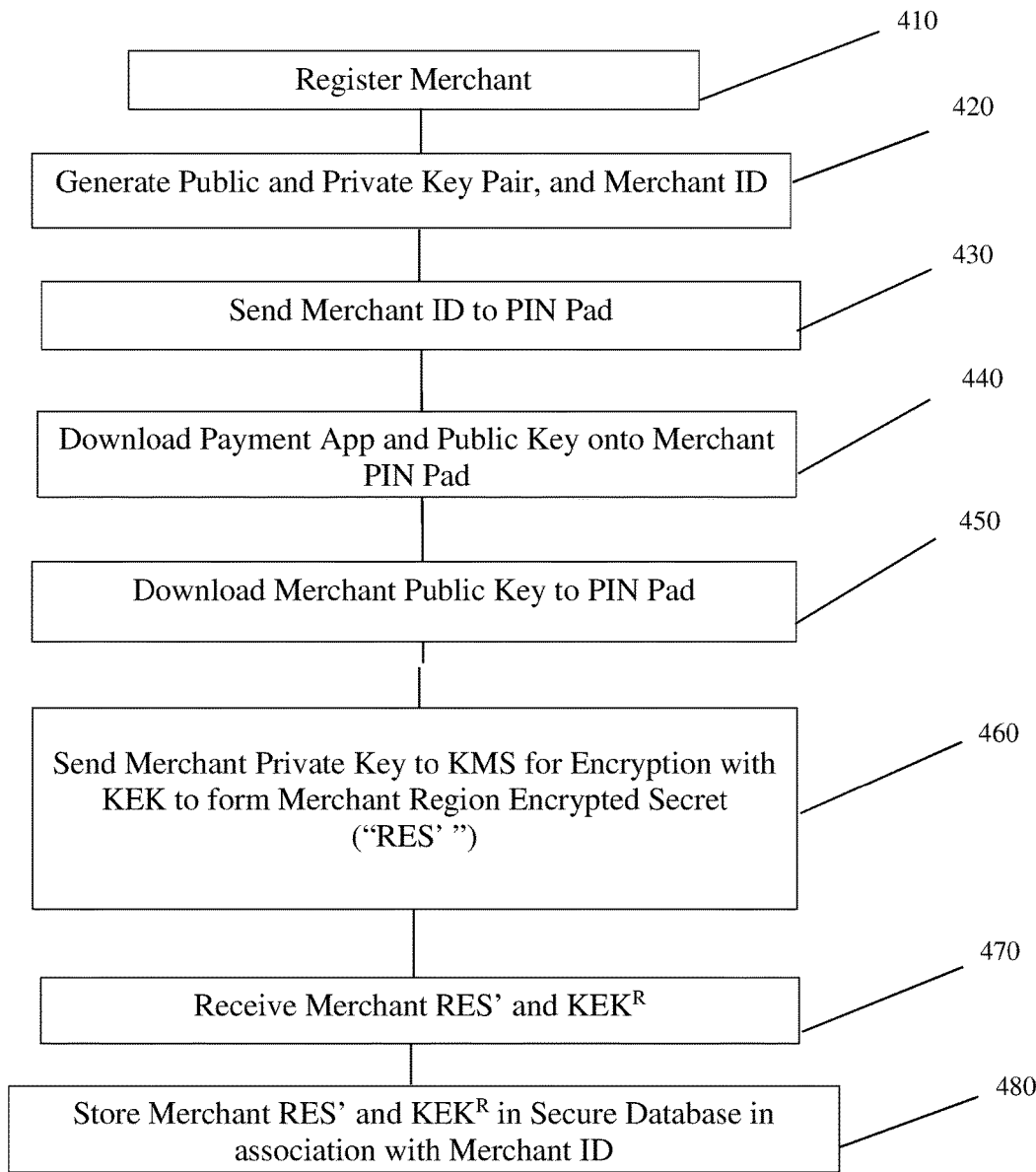
FIG. 6 is a flowchart of an example of key creation for a new merchant, in accordance with an embodiment on invention.

FIG. 6 is a flowchart 400 of an example of key creation for a new merchant, in accordance with an embodiment on invention. To participate in the card processing environment 100, a merchant, such as the Merchant 1, registers with the processing center 150. In one registration example, the merchant provides identifying information and store locations, for example, in Step 410. The Merchant 1 typically has or obtains PIN pads 130 on its own. Registration may be conducted via a webpage of the payment processing center 150, for example.

The processing center 150 then generates a public/private key pair for the Merchant 1, in Step 420. In one example, the public/private key pair is generated by an RSA generation algorithm, such as a 2048-bit RSA encryption algorithm run by the processing device 280 of the SCDE 180. RSA encryption algorithms, including a 2048-bit RSA encryption algorithm, are known in the art. The corresponding public key of the Merchant 1 is also signed by a Certificate of the processing center 150, which also acts as a trusted Certificate Authority.

A unique merchant ID and other credentials are also generated, as is known in the art, and sent to the Merchant 1, in Step 430. If the merchant has multiple stores, a respective store ID may be generated for each store. In addition, the Merchant 1 assigns terminal IDs to each PIN pad terminal 130. Terminal IDs are used by the processing center 150 to determine the PIN pad terminal 130 that sent the encrypted HTTPS envelope requesting approval/denial of the payment so that the approval or denial can be sent hack to the proper terminal.

The Merchant logs into the website of the processing center 150, authenticates itself using the merchant ID and credentials previously assigned by the processing center, and requests the Payment App 136 from the processing center. If the Merchant 1 is authenticated, the Payment App 136, which includes a Certificate of the processing center 150, is downloaded to the merchant PIN pad terminals 130, in Step 440.

After the Payment App 136 is downloaded to a respective PIN pad terminal 130, the PIN pad terminal requests the merchant public key. The public key and signed certificate are downloaded to the PIN pad terminal 130, in Step 450. The PIN pad terminal 130 confirms that the public key has been received by a trusted source, by comparing the certificate provided in with the Payment App 136 to the Certificate received with the public key. If there is a match, the PIN pad terminal 130 accepts the public key.

The public key, Payment App 136, and Merchant ID may be downloaded to the PIN pad terminals 130 via the network 110, in secure HTTPS envelopes, as described above, for example. If the merchant has multiple stores, then the store ID for the store in which the PIN pad 130 will be located may also be loaded onto the respective PIN pad 130.

To securely store the merchant private key, the private key is treated as an RES that is sent to the KMS 200 for encryption, via the applications server 170 and the network 110, in Step 460. The KMS 200 may encrypt the merchant private key with the KEK 202 that has been generated by the KMS for the processing center 150. The encrypted merchant private key, also referred to as a merchant region encrypted secret ("merchant RES'"), is returned to the processing center 150 with an associated $KEK^R$ as discussed with respect to FIG. 5.

The merchant RES' and the $KEK^R$ are received by the processing center 150 from the KMS 200, in Step 470. The merchant RES' and the $KEK^R$ are stored in the secure database 300, in Step 480 in association with the merchant ID.

It is noted that Steps 460-480 may take place before, during, or after Steps 430-450.

Figure 7:
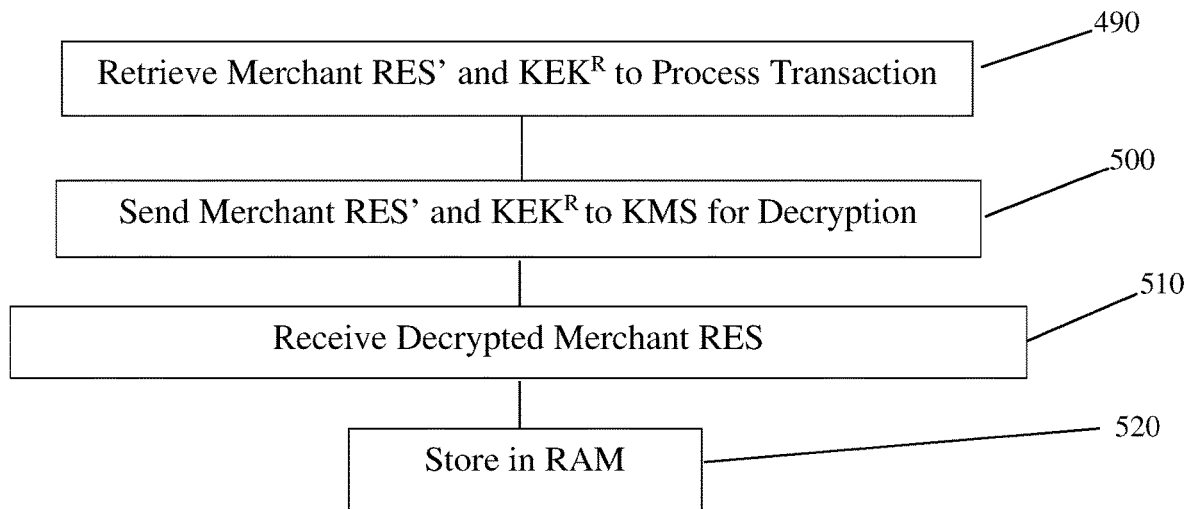
FIG. 7 is a flowchart of an example of a method for retrieving a newly created merchant private key from the secure database.

During a transaction, The PIN pad 130 encrypts transaction data and card data with the merchant public key and sends the encrypted data to the processing center 150. The processing center 150 decrypts the encrypted information with the merchant's private key, as described in more detail below. FIG. 7 is a flowchart of an example of a method for retrieving a newly created merchant private key from the secure database 300. The first time a transaction is received from a PIN pad terminal 130 of a newly registered Merchant 1, the merchant RES' and associated $KEK^R$ are retrieved from the database 300 by the processing device 280, based on the merchant ID received with the transaction, in Step 490.

The merchant RES' is sent to the KMS 200 for decryption, along with the $KEK^R$, via the network 110, in Step 500. The merchant RES' and $KEK^R$ are sent in a secure HTTPS envelope, for example, as discussed above. The merchant RES' is decrypted by the KMS 200 based on the KEK identified by the $KEK^R$ and sent back to the processing center 150 via the network 110. The decrypted merchant RES (merchant private key) is received from the KMS in Step 510 and stored in the RAM 290 in Step 520. The merchant RES (private key) is now available for use in subsequent processing transactions.

In accordance with another embodiment of the invention, key rotation is facilitated and security is further improved by periodically generating a new public/private key pairs. The new key pair is generated by the processing device 280 as described with respect to Step 420 of FIG. 6. The new public key is sent to the PIN pad terminal 130, as described in Step 450 of FIG. 6, the new merchant private key is sent to the KMS 200 for encryption, the encrypted merchant RES' is received by the processing device 280, and the new merchant RES' is stored in the secure database 300, as described with respect to Steps 460-480. The prior merchant RES' is deleted from the secure database 300. The new merchant RES', which is not yet stored in the RAM 290, is retrieved from the secure database 300 when needed to decrypt encrypted data from a PIN pad terminal 130, as described in FIG. 7. The merchant RES is then stored in RAM 290 when needed next. The processing device 280 may be configured to cause key rotation on a predetermined schedule, as is known in the art.

Card Number Encryption and Decryption

Card numbers, also referred to personal account numbers ("PANs"), are highly sensitive information. In accordance with an embodiment of the invention, PANs are encrypted by a multi-level encryption process for higher security, based on salts, keys, and the KEK. Plain text card data, which includes the PAN and other card related information, such as the Card holder name, expiration date card verification value ("CVV"), PIN Verification Key, Pin Verification Value, card verification code, and/or EMV specific card information, for example, is also highly sensitive information. Card data that may be included in the plain text card data is described in ISO/IEC 7813, for example. EMV specific card information is described in ISO/IEC 7816 and EMV Books 1-4, available from EMVCo LLC, for example. Plain text card data is encrypted via keys, such as AES keys, and the KEK.

Figure 8:
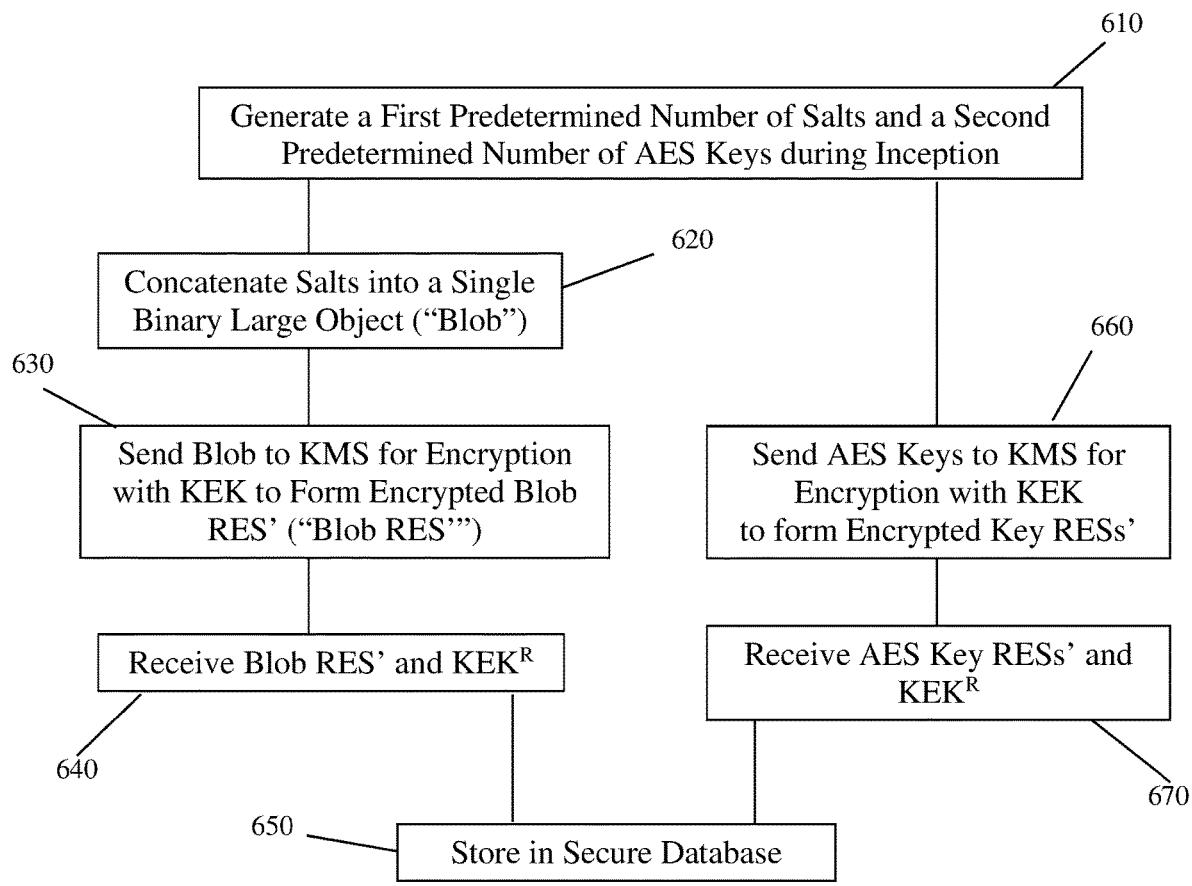
FIG. 8 is a flowchart of an example of a method for preparing salts and keys for encrypting sensitive information, such as personal account numbers ("PANs") and plain text card data, for example, in accordance with an embodiment of the invention.

FIG. 8 is a flowchart of an example of a method for preparing salts and keys for encrypting sensitive information, such as PANs and plain text card data, for example, in accordance with an embodiment of the invention. While in this embodiment, both salts and keys are used, other embodiments of the invention may only use salts to encrypt sensitive information such as PANs, and other embodiments of the invention may only use keys to encrypt sensitive information such as plain text card data, for example.

In the present embodiment of the invention, a first predetermined number of salts and a second predetermined number of keys, are generated by the processing device 280 of the SCDE 180 during inception of the processing system 150 or at a later time, in Step 610. In this example, the first predetermined number of salts is 1009 salts, and the second predetermined number of keys is 379, which are large prime numbers. Other numbers of salts and AES keys may be generated and used.

In one example, the salts may be any length and may be non-random. In another example, the salts are cryptographically strong, as defined in FIPS 140-2, for example. In this example, each salt is 512 random bytes generated by a cryptographically secure random number generator, such as Secure Random in Java available from Oracle, Inc., for example.

The keys may be AES keys, such as 256-bit AES keys, for example. As discussed above, an AES key is an advanced encryption standard ("AES") key, such as a 256-bit AES key, for example. The AES keys could also be 512-bit AES keys. Generation of a 256 and 512-bit AES keys are known in the art. Other highly secure encryption techniques could also be used to encrypt the card information, such as Triple DES (3DES), for example, which is also known in the art.

The salts are concatenated into a binary large object ("blob"), where one salt follows the next, by the processing device 280, in Step 620. The blob is sent to the KMS 200, via the applications server 170 and the network 110, for encryption with the KEK 202 or another KEK, for example, in Step 630. The KMS 200 encrypts the blob to form a blob RES' and returns the blob RES' with a $KEK^R$ to the processing device 280, via the network 110 and the applications server 170. The blob RES' and the $KEK^R$ are received by the processing device 280 in Step 640 and stored in the secure database 300, in Step 650.

The AES keys are also sent to the KMS 200 for encryption, through the applications server 170 and the network 110, in Step 660. The AES keys are each encrypted by the KMS 200 with the KEK 202 or another KEK to form AES key RESs', which are received hack from the KMS, through the network 110 and the applications server 170, in Step 670. The AES key RESs' and $KEK^R$s are also stored in the secure database 300, in Step 650.

Decrypting RES's for Use

Figure 9:
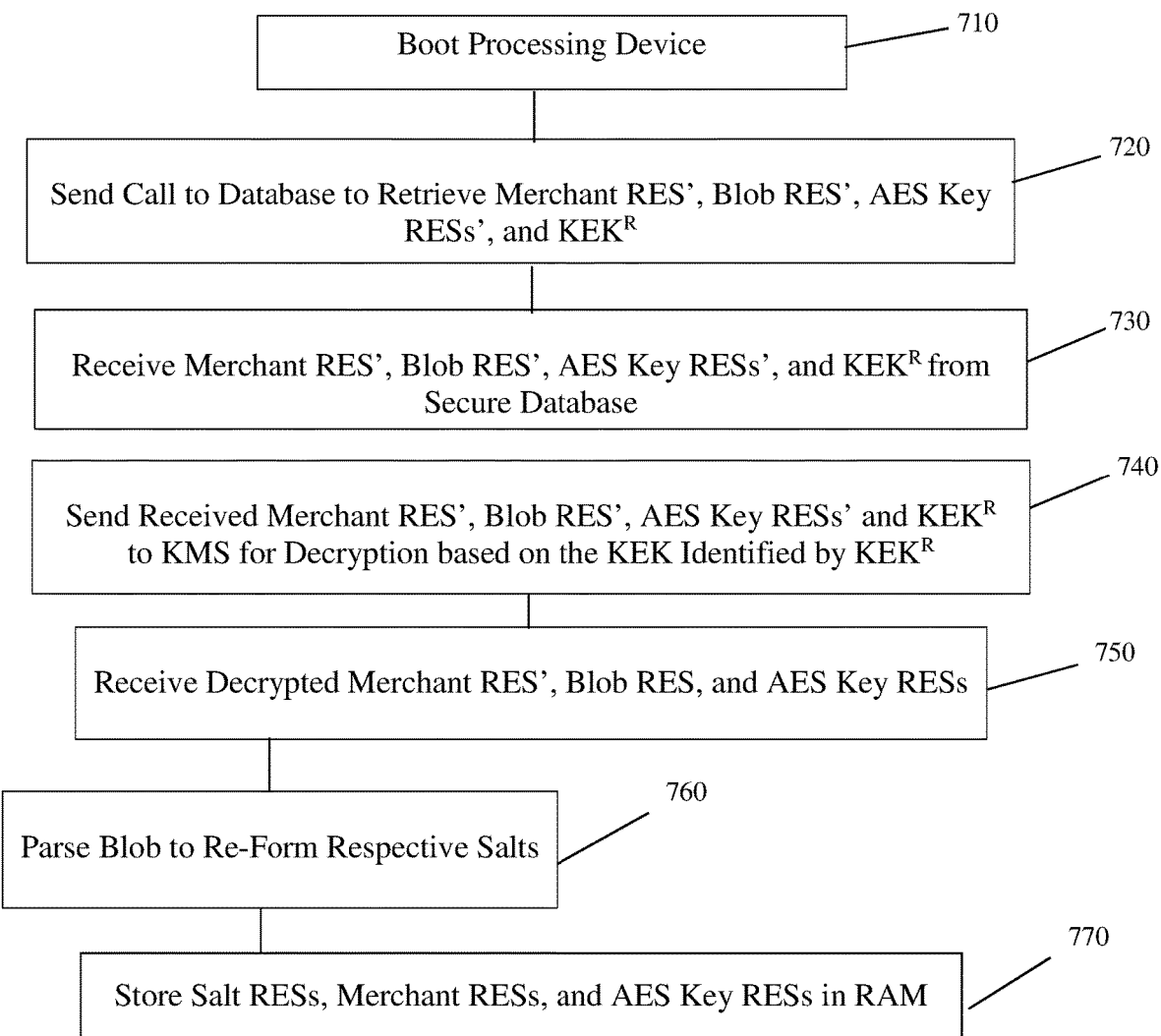
FIG. 9 is an example of a method of decrypting and storing in RAM other merchant RESs', the blob RES', and the AES key RESs', for use during a boot process.

As noted above with respect to FIG. 7, the first time a merchant private key is needed, the encrypted merchant private key, in the form of the merchant RES', is retrieved from the secure database 300, sent to the KMS 200 for decryption, received back as the merchant RES and stored in the RAM 290. Other merchant RESs', the blob RES', and the AES key RESs' are decrypted and stored in RAM for use during a boot process, as described below with respect to FIG. 9.

The processing device 280 of the SCDE 180 is booted (restarted) in Step 710. Booting may take place when a new version of the software running the processing device 150 is loaded, or when the software is updated, to improve system operation, for example. After boot up, the processing device 280 sends a call to the secure database 300 to retrieve all the merchant RES', blob RESs', and AES key RESs', along with the associated $KEK^R$, in Step 720. As noted above one or more $KEK^R$s may need to be retrieved.

The merchant RES', blob RESs', and AES key RES's, along with the associated $KEK^R$, are received by the processing device 280, in Step 730, and sent through the applications server 170 and the network 110 to the KMS 200 for decryption based on the KEK 202 identified by the $KEK^R$, in Step 740.

The decrypted RESs are received by the processing device from the KMS 200, via the network 110 and applications server 170, in Step 750. The blob RES, which is the concatenated salts, is parsed to separate the original, individual salts, in Step 760. The concatenated salts may be parsed based on the known lengths of each salt, for example.

The individual salts, the merchant RESs, and the AES key RESs are stored in volatile memory, such as the RAM 290, by the processing device 280, in Step 770. The salt RESs and AES key RESs may be stored in respective lists in the RAM 290, where each entry in the respective list is numbered consecutively, or in an ordered list, for example. The ordered list may comprise a numbered listing or table, in which each salt is correlated with a respective number, here 0-1008, respectively, and each AES key is correlated with a respective number 0-378. The salts, merchant RESs, and AES key RESs are now available for use during the processing of payment transactions, and to securely store card numbers and other card information, for example.

As discussed herein, after a customer swipes their card or inserts their EMV card in the PIN pad terminal 130, the PIN pad generates a secure, encrypted HTTPS envelope containing the card number (personal account number ("PAN")), along with other data including the transaction amount, a merchant ID, a store ID, PIN pad terminal ID, cardholder's name, card expiration date, and optionally customer's PIN Verification Key, PIN Verification Value, card verification value ("CVV"), or card verification code, and other information known in the art.

The data is encrypted by the PIN pad terminal 130 based on the merchant's public key, in accordance with an embodiment of the invention. Other encryption techniques could be used. Also included in the secure envelope is the merchant ID. The merchant ID is not encrypted by the public key, in this example. The PIN pad terminal 130 sends the HTTPS envelope to the processing center 150 via the network 110.

Figure 10A:
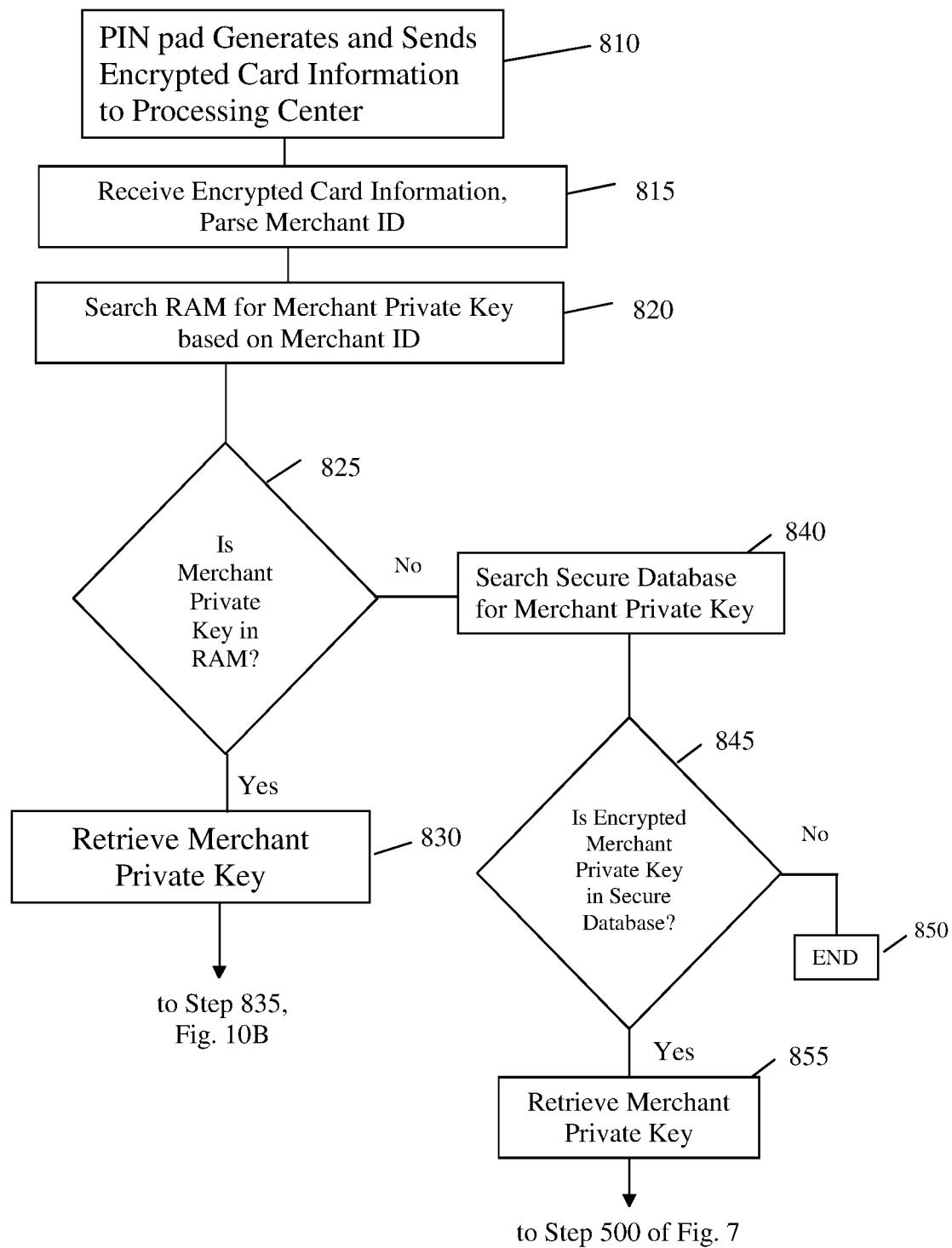
FIG. 10A-10B is a flowchart of an example of a method of the processing the card information received from the PIN pad terminal, by the processing center.

FIG. 10A is a flowchart of an example of a method of the processing the card information received from the PIN pad terminal 130, by the processing center 150. The PIN pad terminal 130 generates the secure HTTPS encrypted envelope and sends it to the processing center 150, via the network, in Step 810. The encrypted envelope is received by the processing device 280, via the network 110 and applications server 170, where it is decrypted, as is known in the art. The decrypted envelope is parsed by the processing device to identify the Merchant ID, in Step 815. As noted above, the Merchant ID is not encrypted. The processing device 280 then searches the RAM 290 for the unencrypted merchant RES (private key), based on the Merchant ID, in Step 825.

It is then determined whether the merchant RES is stored in the RAM, in Step 825. If the merchant RES is stored in the RAM 290, (Yes in Step 825), the merchant RES is retrieved from the RAM 290 by the processing device 280, in Step 830. If the merchant RES is not found in the RAM (No in Step 825), then the processing device 280 searches the secure database 300 for the encrypted merchant RES', in Step 840. As noted above, the first time a transaction is received from a merchant after registration, the unencrypted merchant RES (private key) is not yet stored in RAM 290. Only the encrypted merchant RES' (private key) is stored in the secure database 300. The processing device 280 may check the secure database for the encrypted merchant RES by sending the merchant ID and a request for the encrypted merchant RES corresponding to the merchant ID, to the secure database 300.

If the processing device 280 determines that the merchant RES' is not stored in the secure database, then the merchant is not registered with the processing center 150 or there is another problem. The transaction cannot be processed and the method ends in Step 850.

If the processing device 280 determines that the merchant RES' is stored in the secure database, merchant RES' is retrieved in Step 830. The merchant RES' is then sent to the KMS 200, decrypted, and, stored in the RAM 290, as described in Steps 500-520 in FIG. 7. The RAM 290 may then be checked again in Step 820 of FIG. 10A and the process proceeds to Step 825. The merchant RES is retrieved in Step 830, as described above, and the process continues to Step 835 in FIG. 10B.

Figure 10B:
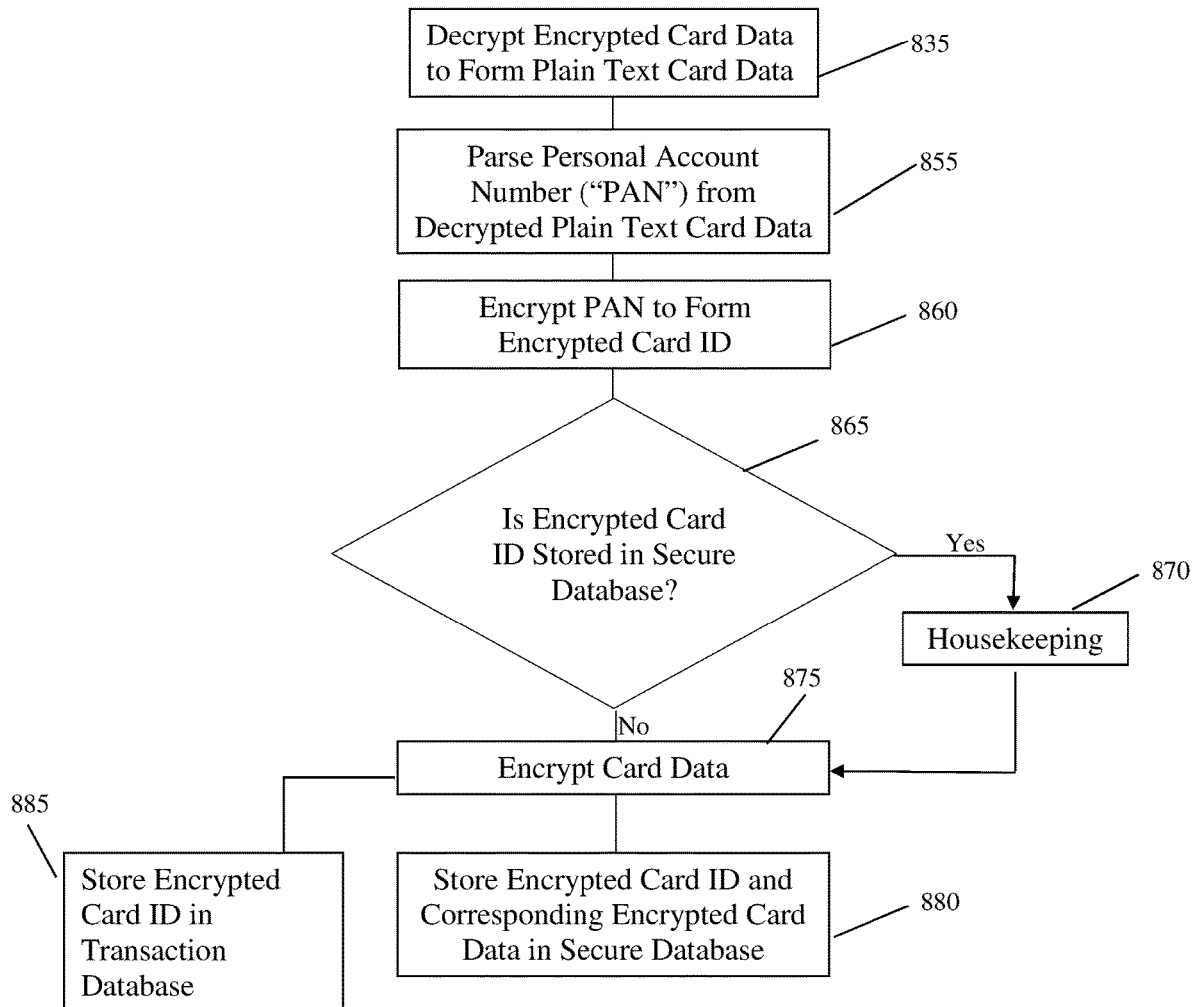

Continuing to FIG. 10B, The processing device 280 decrypts the encrypted card data based on the merchant RES (private key), in a manner known in the art, in Step 835. The result of the decryption is referred to as plain text card data, which includes the PAN, cardholder name, expiration date, CVV, and other items collected from the card, as discussed above and as is known in the art.

The plain text card data is parsed by the processing device 280 to identify the PAN by the processing device 280, in Step 855. The identified PAN is encrypted by the processing device 280 to form an encrypted PAN or encrypted card ID, in Step 860. An example of an encryption process in accordance with an embodiment of the invention is described below with respect to FIG. 11. Other encryption methods may be used, as well.

The processing device 280 searches the secure database 300 for the encrypted card ID to determine whether the encrypted card ID is already stored in the secure database 300, in Step 865. If Yes, then housekeeping functions may optionally be performed, in Step 870. An example of housekeeping in accordance with an embodiment of the invention is described in more detail in FIG. 13.

If the encrypted card ID is not found in the secure database 300 in Step 860, then the plain text card data, including the PAN, is encrypted, in Step 875. An example of plain text card data encryption in accordance with an embodiment of the invention is described below with respect to FIG. 12. Other encryption techniques may be used, as well.

The encrypted card ID and corresponding encrypted plain text card data (also referred to as "encrypted card data") is stored in the secure database, in Step 880. The stored encrypted card ID is used as a pointer to the location of the corresponding encrypted card data in the secure database 300, which facilitates retrieval of the encrypted card data. The encrypted card ID is also stored in the transactions database 270 (see FIG. 3) for use by the applications server 170 to facilitate account look up for marketing and other functionality of the processing center 150 when also functioning as a payment gateway, as described above, in Step 885.

Figure 11:
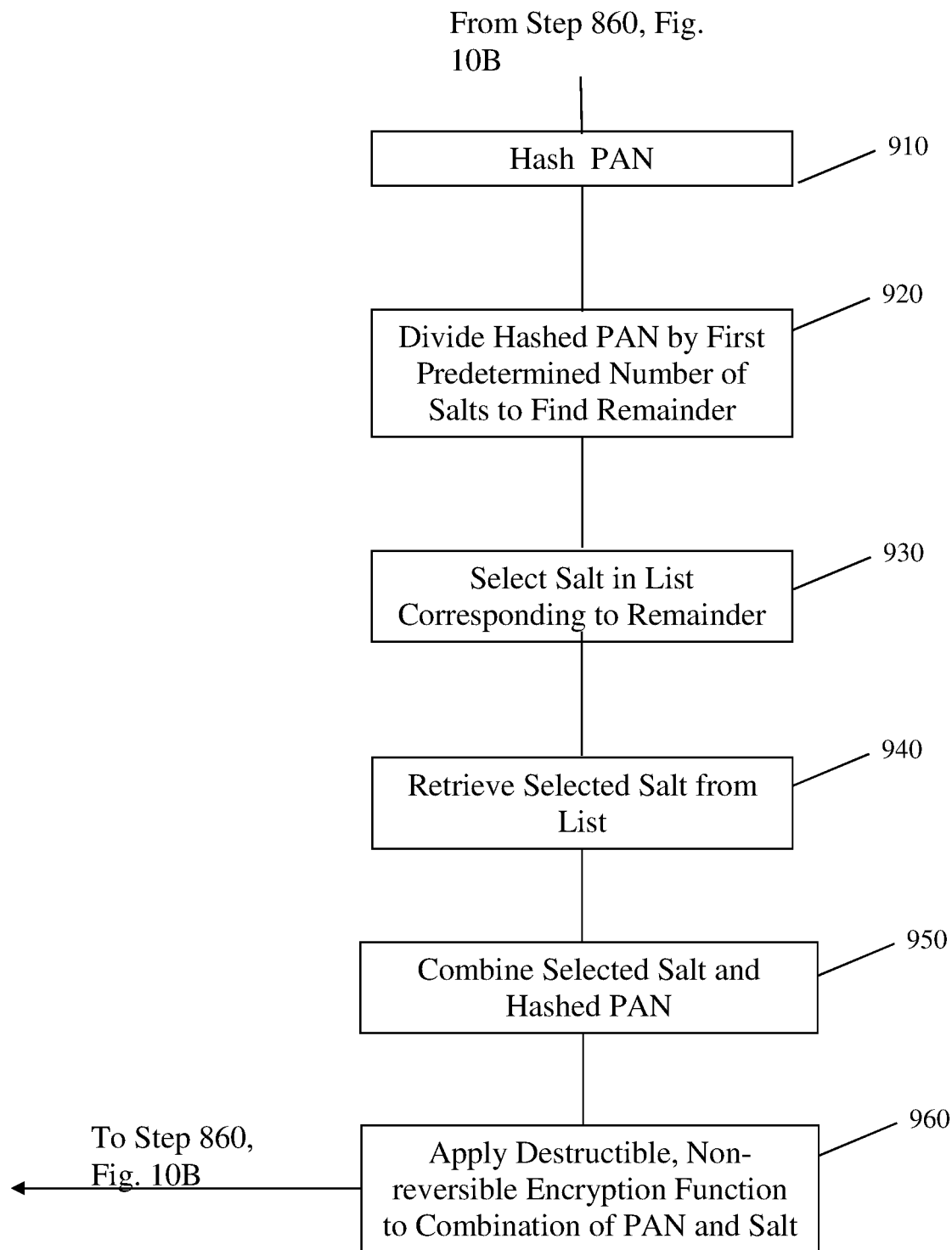
FIG. 11 is a flowchart of an example of PAN encryption to form the encrypted card ID, in accordance with an embodiment of the invention.

FIG. 11 is a flowchart of an example of PAN encryption to form the encrypted card ID, in accordance with an embodiment of the invention. The PAN is hashed by a hash function, by the processing device 280, in Step 910. The hash function may be an MD5 algorithm, for example, which is known in the art. Alternatively, the hash function may be a SHA 256 algorithm, for example.

A salt is selected for addition to the hashed PAN by determining a remainder of the hashed PAN (Step 910) divided by the first predetermined number of salts, here 1009, in Step 920. In other words, in this example, the processing device 280 calculates hashed PAN modulo 1009. The salt in the list or table of salts corresponding to the number of the remainder is selected in Step 930. For example, if the remainder is 10, then the tenth salt or the salt numbered 10 in the list is selected. The selected salt is retrieved, in Step 940.

The retrieved salt is combined with the PAN, in Step 950, to add entropy to the PAN. The salt may be added to the end of the PAN, for example. Alternatively, the salt may be added to the beginning of the PAN. In another example, a part, such as half, of the salt may be added to the beginning of the PAN and the remainder may be added to the end of the PAN.

The combination of the PAN and the salt is encrypted by the processing device 280, in Step 960. The combination of the PAN and the salt may be encrypted by a destructive, non-reversible encryption function, for example. A destructive function sufficiently transforms/destroys the format and structure of the original data so that it cannot be recreated based on the encrypted data, with current technology, as is known in the art. A non-reversible function here means that it is not feasible to reverse the function to decrypt the data with current technology, as is known in the art. An example of a destructive, non-reversible encryption function that may be used is the password-based key derivation function 2—key hashed message authentication code—secure hash 256 algorithm ("PBKDF2-HMAC-SHA256"), for example. SHA 256 is a hash function known in the art. Other hash functions, such as MD5 may be used instead of SHA 256, for example. HMAC-SHA 256 (or other such hash function) applies an authentication code algorithm to the hashed function. Other authentication codes could be used, which are also known in the art, such as LMAC and PMAC. PBKDF2 is an iterative encryption function that has been used to protect passwords. Other iterative encryption functions that may be used include crypt or scrypt, for example, which are also known in the art. The method of FIG. 11 then returns to Step 860 of FIG. 10B.

Figure 12:
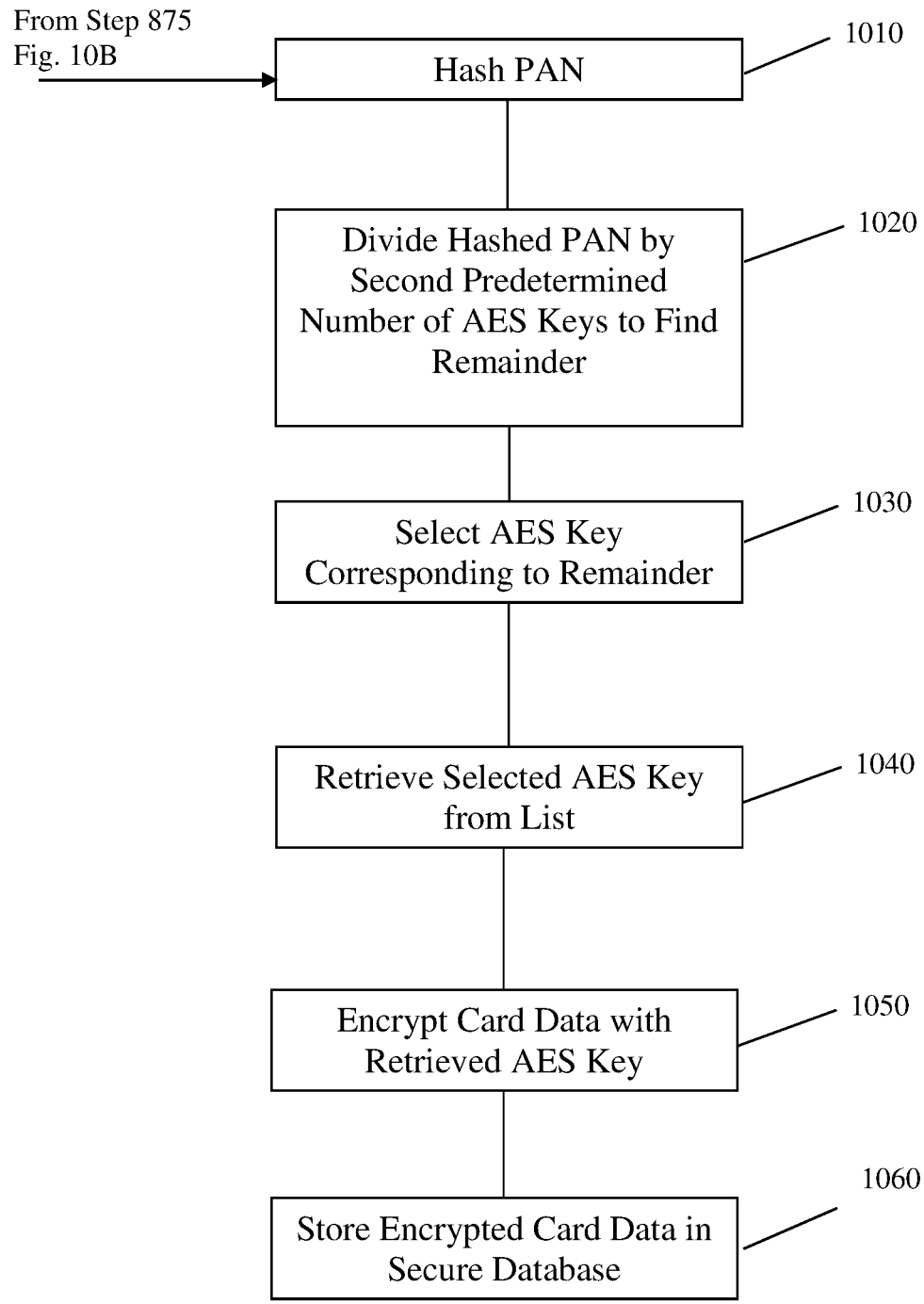
FIG. 12 is a flowchart of an example of a method for encrypting plain text card data in Step 875 of FIG. 10B, in accordance with the embodiment of the invention.

FIG. 12 is a flowchart of an example of a method for encrypting plain text card data in Step 875 FIG. 10B, in accordance with the embodiment of the invention. The PAN is hashed by the processing device 280 in Step 1010 (or the hash from Step 910 of FIG. 11 is used). Hashing of the PAN is described above with respect to FIG. 11. The same hash function or a different hash function as used in Step 910 in FIG. 11, may be used in Step 1030 of FIG. 12. The hashed PAN is divided by the second predetermined number of AES keys, here 379, to find the remainder (hashed PAN modulo 379), in Step 1020. The number of the AES key in the AES key list corresponding to the remainder in the AES key list is selected, in Step 1030. For example, if the remainder is 20, the AES key numbered 20 in the list is selected. The selected AES key is retrieved in Step 1010. The retrieved AES key is used to encrypt the plain text card data by the processing device 280, in Step 1050. The processing device 280 stores the encrypted card data in the secure database 300, in Step 1060.

Housekeeping

Figure 13:
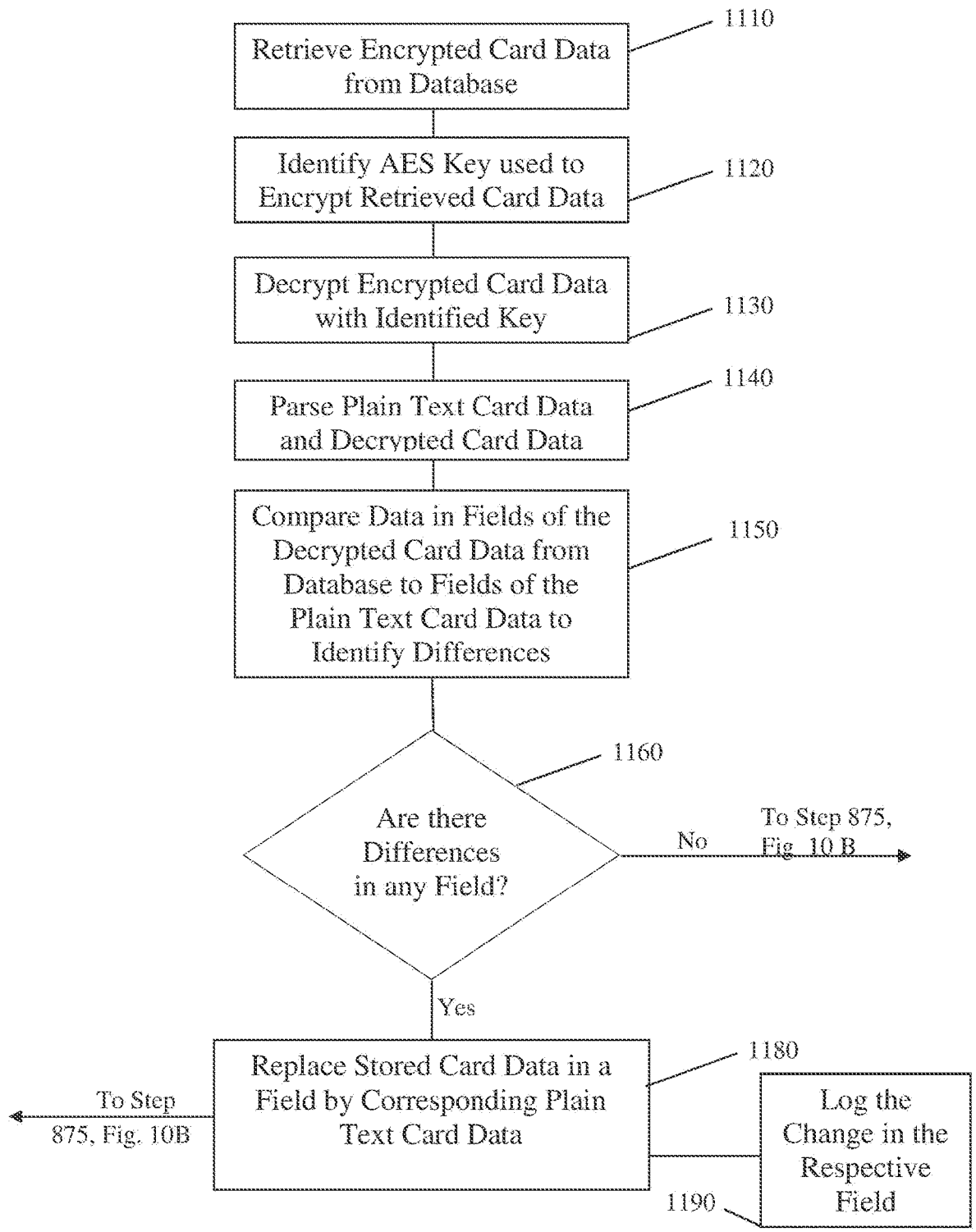
FIG. 13 is flow chart of an example of housekeeping, in accordance with an embodiment of the invention.

FIG. 13 is flow chart of an example of housekeeping, in accordance with an embodiment of the invention. Housekeeping is an optional function, which enables updating of information in stored card data records for a previously used card, such as the expiration date, cardholder name, and EMV information, for example, that may have changed since the last time the card was processed by the processing center 150. For example, a new card may be issued with the same PAN but a different expiration date.

A record corresponding to the encrypted card information received in Step 815 of FIG. 10A is retrieved by the processing device 280, in Step 1110 of FIG. 13. The record contains encrypted plain text card data, as discussed above. In this example, the record containing the encrypted plain text card data is stored in the secure database 300, and the encrypted card ID corresponding to the encrypted plain text card data, which is the encrypted personal account number derived from on the plain text card data, is also separately stored in the secure database 300 as a identifier to point to the location of the record in the secure database 300, as discussed above. This facilitates location and retrieval of the record. The received plain text card data with have the same personal account number ("PAN") as the corresponding record. Searching for the PAN from the received plain text card data therefore enables retrieval of the corresponding record.

The AES key used to encrypt the retrieved encrypted card data is identified by the processing device 280, in Step 1120. In this example, the key is identified from the AES key list based on the hashed PAN modulo 379, as discussed above with respect to FIG. 12. The encrypted card data may be decrypted by the processing device 280 based on the same AES key used to encrypt the card data, in a manner known in the art, in Step 1130.

Different types of data in the plain text card data in located in different fields, as is known in the art. For example, the expiration date, cardholder name, CVV, and other types of information discussed above are located in different, respective fields. The processing device 280 parses the decrypted plain text card data from the record, and the decrypted plain text card data from the decrypted card information, in Step 1140, to separate the information in the respective fields. The processing device 280 may use a card template to locate respective fields, as is known in the art. All fields may be checked or only fields that could have changed, such as the expiration date, cardholder name, and certain EMV information, such as EMV processing instructions from an issuing bank or card brand, for example. The provision of processing instructions on an EMV card by an issuing bank via scripts is described in U.S. patent application Ser. No. 15/699,090, which was filed on Sep. 8, 2017, is assigned to the assignee of the present invention, and is incorporated by reference herein. The card brand may also provide processing instructions.

The information in the respective fields of the decrypted card data is then compared to the information in the corresponding fields of the plain text card data of the record, in Step 1150. The fields may be compared, field by field. If they are the same (No in Step 1150), then the stored card data does not need to be updated, and the process returns to Step 875 of FIG. 10B, where the plain text card data is encrypted again and stored in the record in the secure database 300, in Steps 880 and 885.

If the information in any field in the plain text card data does not match the information in the corresponding field of the decrypted card data (Yes in Step 1160), then the processing device 280 replaces the card data stored in the field of the plain text card data by the corresponding information in the corresponding field of the plain text card data, in Step 1180. For example, if an expiration date of the card has been recently changed, but the card number (PAN) has not been changed, then the expiration date in the expiration date field of the plain text card data will not match the expiration date in the corresponding field of the decrypted card data. The expiration data field of the plain text card data is then updated, in Step 1190, to the expiration date of the current plain text card data. A cardholder name may also change without changing the PAN, for example.

The plain text card data of the record is then encrypted, as described above in Step 875 of FIG. 10B and stored in the secure database 300 in Step 880. The processing device 280 logs updates to the plain text card data in the record in a log stored in the secure database 300, for example. The logged data may be used by the processing center 150 to perform debugging in the event of errors, analytics on card data update frequency, and/or heuristics based on card type, for example. If they are the same (No in Step 1150), then the stored card data does not need to be updated, and the process returns to Step 875 of FIG. 10B, where the plain text card data is encrypted again and stored in the record in the secure database 300, in Step 880.

Embodiments of the invention may be used to update other types of encrypted records stored in a database, including health or medical records, for example. Updateable fields in medical records may include a patient's name, address, medications, weight, and/or diagnosis, for example. A medical template may be used to locate respective fields.

Region Redundancy

As discussed above, redundancy in case of a failure with an availability zone (AZ) may be provided by using different power supply companies, using different network providers to back up data, and storing the data in other storage devices in other AZs, for example. In accordance with an embodiment of the invention, redundancy across regions is provided through the use of one or more respective KMSs in multiple regions.

Figure 14:
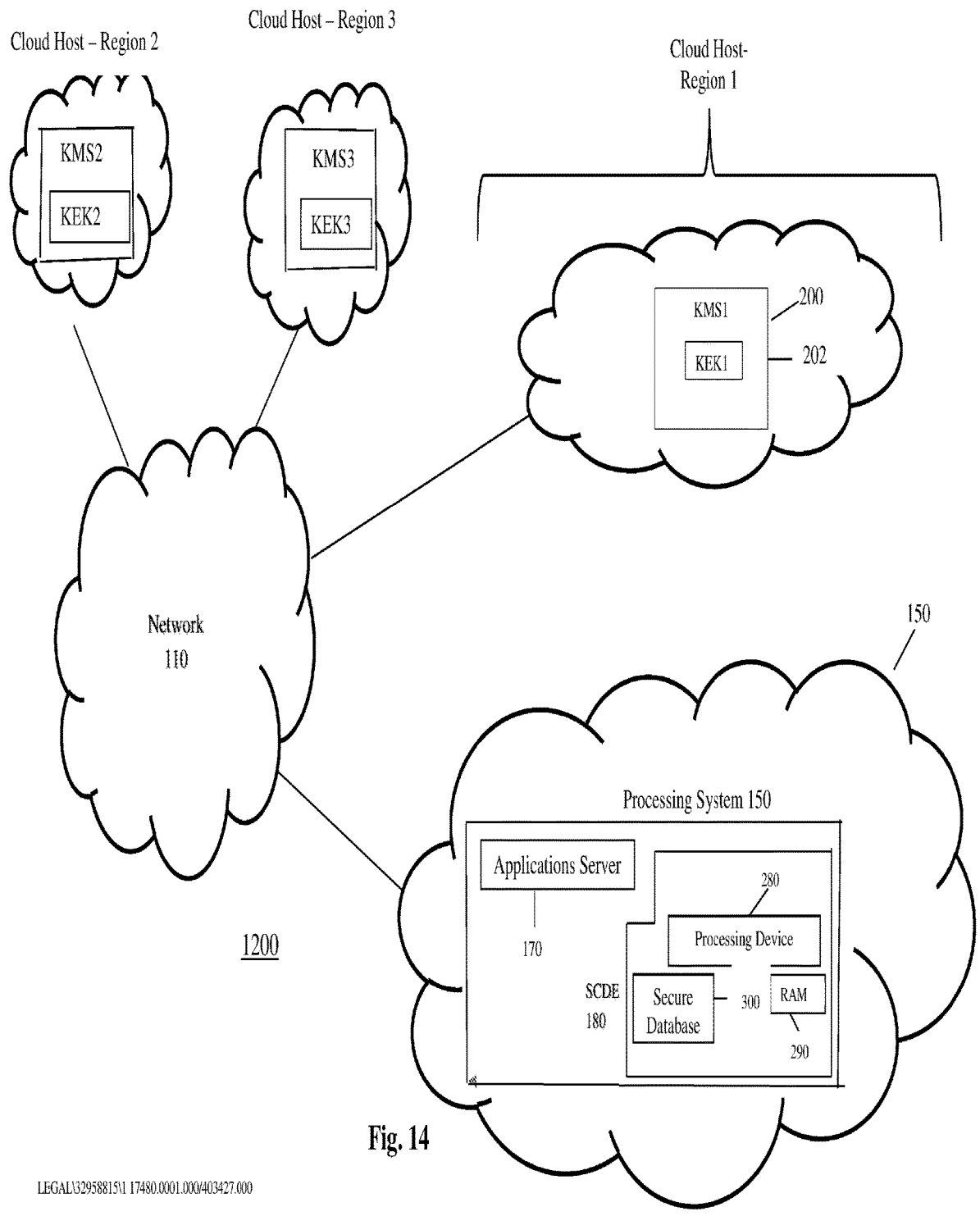
FIG. 14 is a block diagram of an example of a portion of a card payment processing system that provides region redundancy, in accordance with an embodiment of the invention.

FIG. 14 is a block diagram of an example of a portion of a card payment processing system 1200 that provides region redundancy in accordance with an embodiment of the invention. Items common to the system of 100 of FIGS. 1-13 are commonly numbered. The Merchant 1, 2, 3 . . . N, payment processors 160*a*-160*c*, card brand 165, and bank 168 of FIG. 1 are not included in FIG. 14 for use of illustration. It is understood that those entities may interact with the processing center 150 in FIG. 14 in the same way as described with respect to FIGS. 1-13.

In the example of FIG. 14, a KMS 1 (numbered 200), is shown in a cloud hosted Region 1 of the cloud hosting provider, along with the processing center 150. In this example, the processing center 150 and KMS1 are both in Region 1 and KMS1 is the "nearest neighbor" (the KMS closest geographically) to the processing center 150. A second KMS2 and a third KMS3 are also provided in Region 2 and in Region 3 of the cloud host provider, respectively. Each KMS1, KMS2, KMS3 generates a unique KEK1, KEK2, KEK3, respectively, for the processing center 150 upon the request of the processing center, as indicated in FIG. 14. KEK requests to each KMS are made through the AWS console as described above. In other examples, more KMSs may be provided in additional regions, or only two KMSs are provided in two regions. Each KMS1, KMS2, KMS3 also generate a respective KEK1$^R$, KEK2$^R$, KEK3$^R$ to identify each respective KEK1, KEK2, KEK3. In accordance with this embodiment of the invention at least two (2) KMS are provided in two (2) different regions such as KMS1 and KMS2. The additional components of the KMS 200 discussed above, are also provided in each KMS1, KMS2, KMS3.

The processing device 280 communicates with KMS1, KMS2, and KMS3 via the applications server 170 and the network 110. Redundancy across Region 1, Region 2, and Region 3 is provided in this example by the processing device 280 sending each merchant RES, blob RES, and AES key RESs to the KMS1, KMS2, and KMS3 of each region for encryption with the respective KEK1, KEK2, and KEK3 to form Merchant RES1', RES2', RES3', blob RES1', RES2', RES3', and AES key RES1*s*', RES2*s*', RES3*s*', respectively. If a respective RES' cannot be decrypted by the KMS that encrypted it, another KMS may be requested to decrypt a corresponding RES' that was encrypted by that KMS.

In one example, encrypted merchant RES1', RES2', RES3' blob RES1', RES2', RES3', and AES key RES1'*s*, RES2'*s*, RES3'*s* based on each KEK1, KEK2, KEK3 are received by the processing system 150 and stored. If the KMS 1 is down or otherwise not responsive to requests to decrypt RES1'*s* with KEK1, for example, then RES2'*s* or RES3'*s* may be sent to KMS2 and/or KMS3 in Regions 2 and 3 for decryption based on KEK2 or KEK3, respectively. The processing center 150 may thereby continue to operate, even if KMS1 and KMS2 go down.

Figure 15:
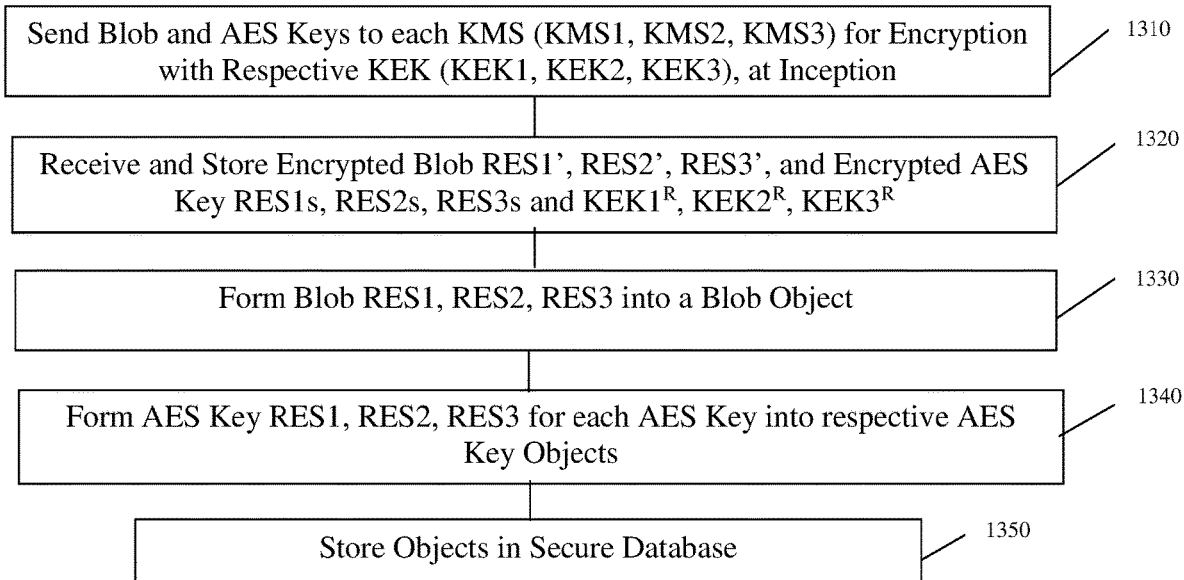
FIG. 15 is an example of a flowchart of the encryption of the blob of salts and the AES keys, in a region redundant system of FIG. 14, in accordance with the embodiment of the invention.

FIG. 15 is an example of a flowchart of the encryption of the blob of salts and the AES keys, in a region redundant system 1200, in accordance with this embodiment of the invention. After the salts and AES keys are generated and a blob of salts formed, as described in FIG. 8, for example, the blob and AES keys are sent by the processing device 280 to each KMS, here KMS1, KMS2, KMS3 for encryption with a respective KEK1, KEK2, KEK2, in Step 1310.

The blobs KMS1, KMS2, KMS3, encrypted by KEK1, KEK2, KEK3, respectively, are referred to as encrypted blob RES1', RES2', RES3' respectively, in Step 1310. The AES keys encrypted by KMS1, KMS2, KMS3 with KEK1, KEK2, KEK3 are referred to as AES key RES1'*s*, RES2'*s*, and RES3'*s*, and KEK1$^R$, KEK2$^R$, KEK3$^R$, and are received by the processing device 280 from each KMS1, KMS2, KMS3, via the network 110 and applications server 170, in Step 1320. Respective encrypted blobs RES1', RES2', RES3' are combined by the processing device 280 into a single object and the object is stored by the processing device 280 in the secure database 300, in association with the KEK$^R$1, KEK$^R$2, KEK$^R$3, in Step 1330.

Each AES key RES1', RES2', RES3' for a respective AES key are also formed by the processing device 280 into respective objects and stored by the processing device 280 in the secure database 300, in Step 1330, in association with the KEK$^R$1, KEK$^R$2, KEK$^R$3.

Figure 16:
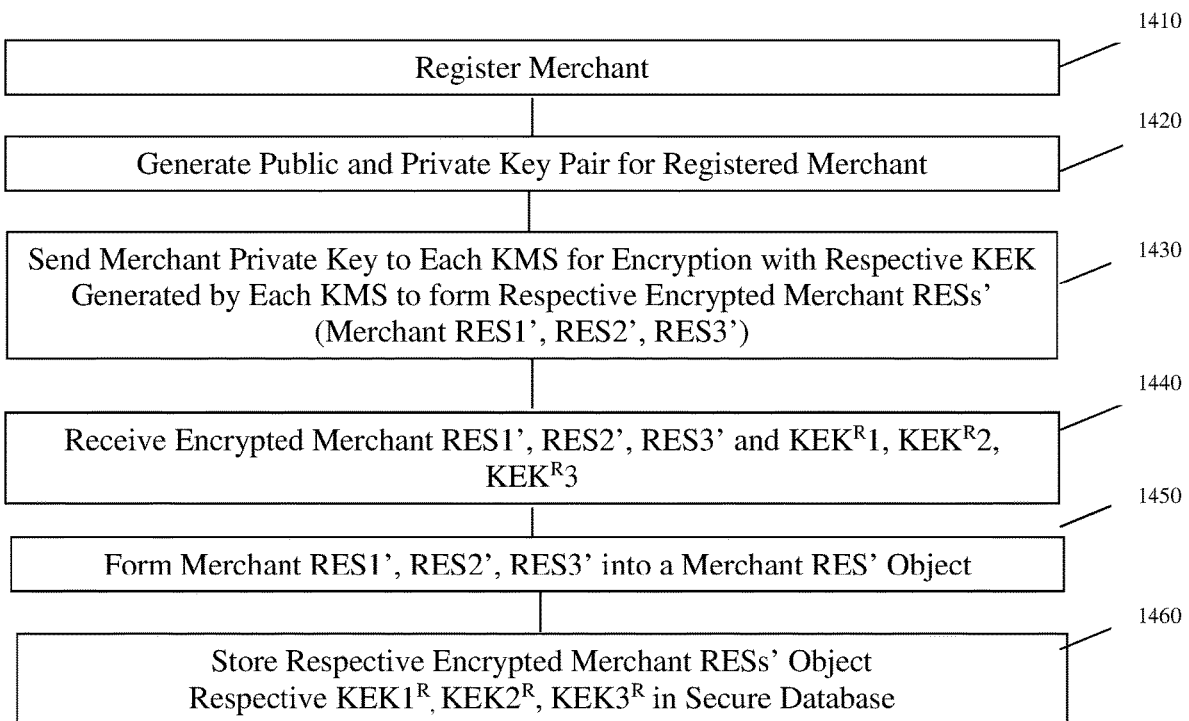
FIG. 16 is an example of a process for encrypting merchant private keys in the redundant system of FIG. 14, in accordance with an embodiment of the invention.

FIG. 16 is an example of a process for encrypting merchant private keys in the redundant system 1200 of FIG. 14, in accordance with an embodiment of the invention. When a respective merchant registers with the processing center 150, in Step 1410, a public and private key are generated by the processing device 280 in Step 1420, as described above with respect to FIG. 6. The merchant private key is sent by the processing device 280 to KMS1, KMS2, KMS3 for encryption, via the applications server 170 and the network 110, in Step 1430. The merchant RES1', RES2', RES3' are received by the processing device 280 in Step 1450 and formed into a single object, in Step 1440. The object is stored in the secure database 300, by the processing device 280, along with the received $KEK1^R$ $KEK2^R$, $KEK3^R$, in Step 1460.

Figure 17A:
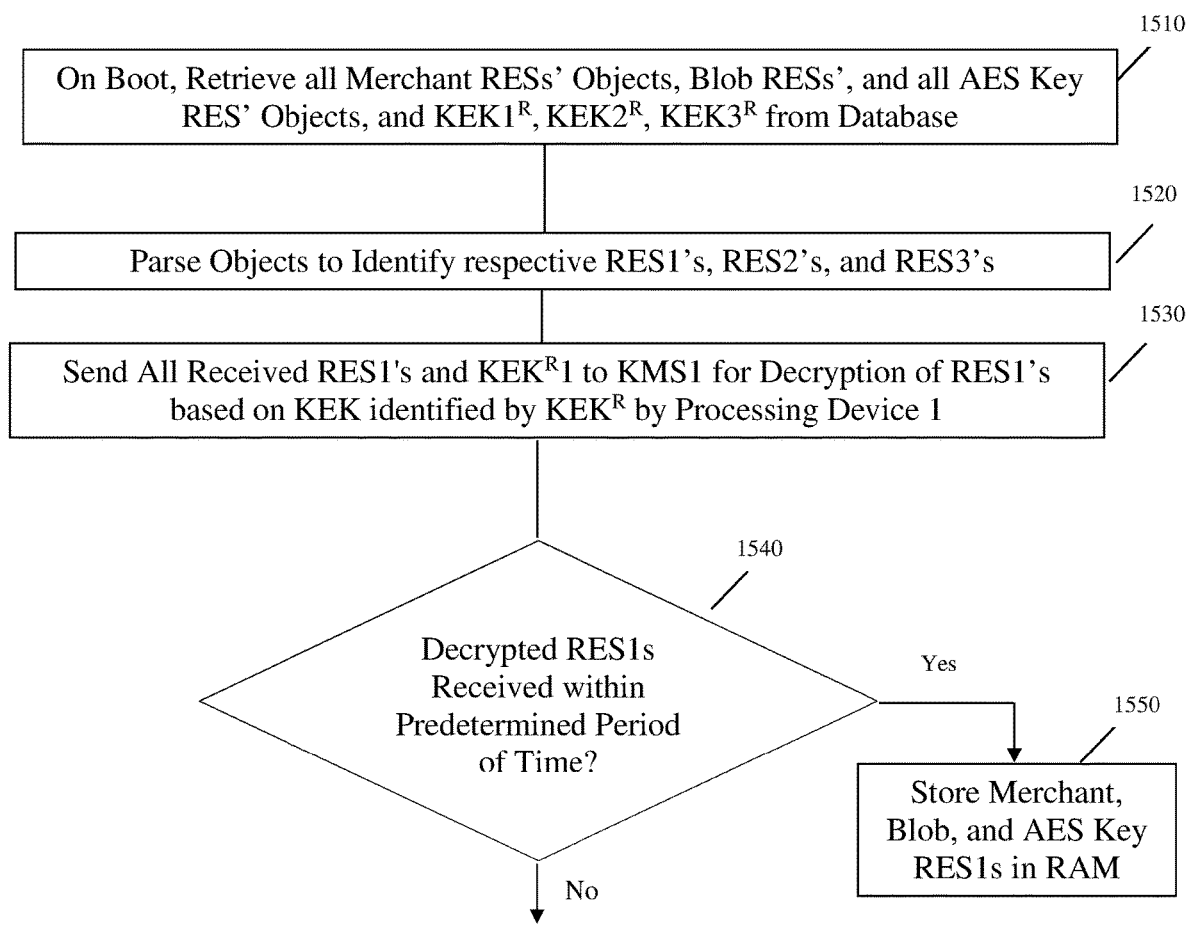
FIGS. 17A-17B is an example of the flowchart of an example of a boot process in the system of FIG. 14, in accordance with an embodiment of the invention.
Figure 17B:
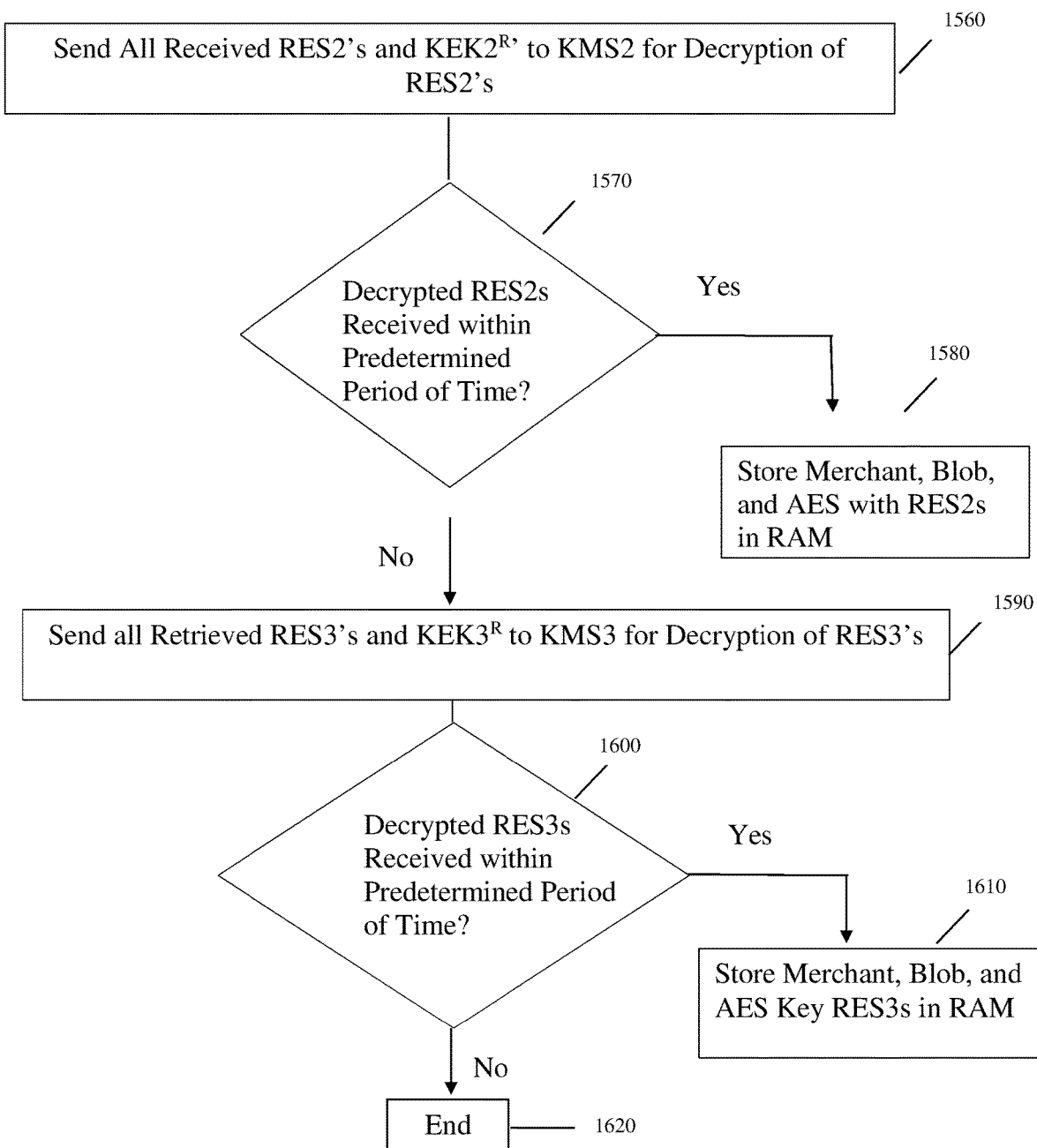

FIGS. 17A-17B is an example of the flowchart of an example of a boot process in the system 1200 of FIG. 14, in accordance with an embodiment of the invention. During a boot, all merchant RES' objects, blob RES' objects, and AES Key RES' object are retrieved from the service database by the processing device 280, along with associated $KEK^R1s$, $KEK^R2s$, $KEK^R3s$ in Step 1510. The objects are parsed into their three respective RES1's, RES2's, RES3's by the processing device 280, in Step 1520. The objects may be parsed based on the expected lengths of the RES1', RES2', RES3', which are known based on the lengths of the unencrypted data and the encryption methods applied, for example. Alternatively, the RES' object may be in the form of an array in which the first element is the respective RES1', the second element is the respective RES2', and the third element is the RES3'.

In Step 1530, the RES1's and associated $KEK^R1s$ are sent by the processing device 280 to KMS1 for decryption, via the applications server 170 and the network 110. In this example, KMS1 and the processing center 150 are both in Region 1, and the KMS1 is the nearest neighbor to the processing system 150.

The processing device 280 waits a predetermined period of time to receive the decrypted merchant, blob, and AES key RES1s, in Step 1540. If the decrypted RES1s are received within the predetermined period of time, (Yes in Step 1540), the merchant, blob, and AES key RES is are stored in the RAM 290, in Step 1550. If not (No in Step 1540), then KMS1 may have failed. Decryption requests in this example are sent to KMS1 first because KMS1 is the closest KMS geographically to the processing center 150. Communication between the processing center 150 and the KMS1 is therefore faster than the communication between the processing center and KMS2 and KMS3.

The processing device 280 then sends the retrieved RES2's to KMS2 and associated $KEK^R2s$, via the applications server 170 and the network 110, for decryption, in Step 1560. In this example KMS2 is the next nearest neighbor after KMS1. The processing device 280 waits a predetermined period of time to receive the decrypted merchant, blob, and AES key RESs, in Step 1570. If the decrypted RES2s are received in the predetermined period of time, then the merchant, blob, and AES key RES2s are stored in the RAM 29, in Step 1580.

If not, then KMS2 may have failed and the processing device 280 sends the retrieved RES3's and associated $KEK^R3s$ to KMS3, in Step 1590. The processing device 280 waits a predetermined period of time to receive the decrypted merchant, blob, and AES key RES3s, in Step 1600. If the merchant, blob, and AES key RES3s are received in the predetermined period of time, then the merchant, blob, and AES key RES3s are stored in the RAM 290, in Step 1610. If not, then the process ends in Step 1620. Such an occurrence is very unlikely, but possible.

In the example of FIGS. 17A-17B, the KMSs are communicated with in the order of their geographic proximity. In this case, the software controlling the processing device 280 is configured to cause the processing device to send the respective RES1's, RES2's, RES3's to KMS1 KMS2, KMS3, respectively, in that order.

In another example, the respective RES1', RES2', RES3' are sent to the KMS1, KMS2, KMS3, respectively, based on the result of a random number generator, for example. The random number generator may generate a list of the KMSs in a random order and the processing device 280 then checks the list to determine which KMS to contact first, second, and third, etc. Other selection schemes may be used. The process of FIGS. 17A-17B may be suitably modified by one of ordinary skill in the art to select the order of requesting decryption from the KMS1, KMS2, and KMS3 in accordance with different selection schemes.

Examples of implementations of embodiments of the invention are described above. It would be apparent to one of ordinary skill in the art that modifications may be made to the examples above without departing from the spirit and scope of the invention, which is described in the following claims.

We claim:

1. A method of encrypting and decrypting data comprising:
    sending, by a server computer system, sensitive information to a first cryptographic processing system of a first cloud computing system to generate first encrypted sensitive information by performing encryption of the sensitive information with a first encryption key generated by and stored by the first cryptographic processing system;
    storing, by the server computer system, the first encrypted sensitive information received from the first cryptographic processing system in a first database;
    sending, by the server computer system, the sensitive information to a second cryptographic processing system of a second cloud computing system, different from the first cloud computing system, to generate second encrypted sensitive information by performing encryption of the sensitive information with a second encryption key generated by and stored by the second cryptographic processing system;
    storing, by the server computer system, the second encrypted sensitive information received from the second cryptographic processing system in a second database, in response to receiving encrypted transaction data from a user device, sending, by the server computer system, the first encrypted sensitive information to the first cryptographic processing system, receiving, by the server computer system from the first cryptographic processing system, a decrypted version of the first sensitive information, and storing, in a volatile memory of the server computer system, the decrypted version of the first sensitive information, wherein the server computer system decrypting the encrypted transaction data using the decrypted version of the first sensitive information.

2. The method of claim 1, further comprising:
    in response to determining that the decrypted version of the first sensitive information is not received from the first cryptographic processing system within a first predetermined period of time, sending, by the server computer system, the second encrypted sensitive information to the second cryptographic processing system;

receiving, by the server computer system from the second cryptographic processing system, a decrypted version of the second sensitive information; and storing, in the volatile memory of the server computer system, the decrypted version of the second sensitive information, wherein the server computer system decrypting the encrypted transaction data using the decrypted version of the second sensitive information.

3. The method of claim 1, further comprising:
generating, by the server computer system, a public key, private key pair for a user of the server computer system;
generating, by the server computer system, an identifier for the user;
sending, by the server computer system, a public key of the public key, private key pair to the user device; and
storing, by the server computer system, an encrypted version of a private key of the public key, private key pair.

4. The method of claim 3, wherein storing, by the server computer system, the encrypted version of the private key of the public key, private key pair further comprises:
sending, by the server computer system, the private key as the first sensitive information to the first cryptographic processing system of the first cloud computing system for encryption using the first encryption key generated by the first cryptographic processing system;
sending, by the server computer system, the private key as the second sensitive information to the second cryptographic processing system of the second cloud computing system for encryption using the second encryption key generated by the second cryptographic processing system;
storing a first encrypted version of the private key as the first encrypted sensitive information received from the first cryptographic processing system in the first database; and
storing a second encrypted version of the private key as the second encrypted sensitive information received from the second cryptographic processing system in the second database.

5. The method of claim 3, wherein the user device comprises a PIN pad terminal device associated with the user.

6. The method of claim 5, further comprising:
receiving, from the user device, the encrypted transaction data, the encrypted transaction data encrypted by the user device using the public key, and the encrypted transaction data containing a personal account number of a card, a transaction amount, a user identifier, an identifier of the user device, a name associated with the card, an expiration date of the card, and a PIN verification key, a PIN verification value, a card verification value, a card verification code, or a combination thereof.

7. The method of claim 1, wherein the first database and the second database are the same database.

8. The method of claim 1, wherein the first database is a secure database and the second database is a secure database.

9. The method of claim 1, wherein the first cryptographic processing system comprises a first key management service, a first hardware security module, or a combination thereof, and the second cryptographic processing system comprises a second key management service, a second hardware security module, or a combination thereof.

10. A non-transitory computer readable storage medium, having instructions stored thereon, which when executed by a server computer system, cause the server computer system to perform operations, comprising:
sending, by the server computer system, sensitive information to a first cryptographic processing system of a first cloud computing system to generate first encrypted sensitive information by performing encryption of the sensitive information with a first encryption key generated by and stored by the first cryptographic processing system;
storing, by the server computer system, the first encrypted sensitive information received from the first cryptographic processing system in a first database;
sending, by the server computer system, the sensitive information to a second cryptographic processing system of a second cloud computing system, different from the first cloud computing system, to generate second encrypted sensitive information by performing encryption of the sensitive information with a second encryption key generated by and stored by the second cryptographic processing system;
storing, by the server computer system, the second encrypted sensitive information received from the second cryptographic processing system in a second database;
in response to receiving encrypted transaction data from a user device, sending, by the server computer system, the first encrypted sensitive information to the first cryptographic processing system;
receiving, by the server computer system from the first cryptographic processing system, a decrypted version of the first sensitive information; and storing, in a volatile memory of the server computer system, the decrypted version of the first sensitive information, wherein the server computer system decrypting the encrypted transaction data using the decrypted version of the first sensitive information.

11. The non-transitory computer readable storage medium of claim 10, further comprising:
in response to determining that the decrypted version of the first sensitive information is not received from the first cryptographic processing system within a first predetermined period of time, sending, by the first server computer system, the second encrypted sensitive information to the second cryptographic processing system;
receiving, by the server computer system from the second cryptographic processing system, a decrypted version of the second sensitive information; and
storing, in the volatile memory of the server computer system, the decrypted version of the second sensitive information, wherein the server computer system decrypting the encrypted transaction data using the decrypted version of the second sensitive information.

12. The non-transitory computer readable storage medium of claim 10, further comprising:
generating, by the server computer system, a public key, private key pair for a user of the server computer system; generating, by the server computer system, an identifier for the user;
sending, by the server computer system, a public key of the public key, private key pair to the user device; and storing, by the server computer system, an encrypted version of a private key of the public key, private key pair.

13. The non-transitory computer readable storage medium of claim 12, wherein storing, by the server computer system, the encrypted version of the private key of the public key, private key pair further comprises:
sending, by the server computer system, the private key as the first sensitive information to the first cryptographic processing system of the first cloud computing system for encryption using the first encryption key generated by the first cryptographic processing system;
sending, by the server computer system, the private key as the second sensitive information to the second cryptographic processing system of the second cloud computing system for encryption using the second encryption key generated by the second cryptographic processing system;
storing a first encrypted version of the private key as the first encrypted sensitive information received from the first cryptographic processing system in the first database; and
storing a second encrypted version of the private key as the second encrypted sensitive information received from the second cryptographic processing system in the second database.

14. The non-transitory computer readable storage medium of claim 12, wherein the user device comprises a PIN pad terminal device associated with the user.

15. The non-transitory computer readable storage medium of claim 14, further comprising:
receiving, from the user device, the encrypted transaction data, the encrypted transaction data encrypted by the user device using the public key, and the encrypted transaction data containing a personal account number of a card, a transaction amount, a user identifier, an identifier of the user device, a name associated with the card, an expiration date of the card, and a PIN verification key, a PIN verification value, a card verification value, a card verification code, or a combination thereof.

16. The non-transitory computer readable storage medium of claim 10, wherein the first database and the second database are the same database.

17. The non-transitory computer readable storage medium of claim 10, wherein the first database is a secure database and the second database is a secure database.

18. The non-transitory computer readable storage medium of claim 10, wherein the first cryptographic processing system comprises a first key management service, a first hardware security module, or a combination thereof, and the second cryptographic processing system comprises a second key management service, a second hardware security module, or a combination thereof.

19. A server computer system, comprising: a non-volatile memory and a volatile memory; and a processor coupled with the volatile memory configured to:
send sensitive information to a first cryptographic processing system of a first cloud computing system to generate first encrypted sensitive information by performing encryption of the sensitive information with a first encryption key generated by and stored by the first cryptographic processing system;
store, in the non-volatile memory, the first encrypted sensitive information received from the first cryptographic processing system in a first database;
send the sensitive information to a second cryptographic processing system of a second cloud computing system, different from the first cloud computing system to generate second encrypted sensitive information by performing encryption of the sensitive information with a second encryption key generated by and stored by the second cryptographic processing system;
store, in the non-volatile memory, the second encrypted sensitive information received from the second cryptographic processing system in a second database;
in response to receipt of encrypted transaction data from a user device, send, by the server computer system, the first encrypted sensitive information to the first cryptographic processing system;
receive, from the first cryptographic processing system, a decrypted version of the first sensitive information; and
store, in the volatile memory of the server computer system, the decrypted version of the first sensitive information, the server computer system decrypting the encrypted transaction data using the decrypted version of the first sensitive information.

20. The system of claim 19, wherein the processor is further configured to:
when the decrypted version of the first sensitive information is determined not to have been received from the first cryptographic processing system within a first predetermined period of time, send the second encrypted sensitive information to the second cryptographic processing system;
receive, from the second cryptographic processing system, a decrypted version of the second sensitive information; and
store, in the volatile memory, the decrypted version of the second sensitive information, wherein the server computer system decrypting the encrypted transaction data using the decrypted version of the second sensitive information.

* * * * *